Figure 22:
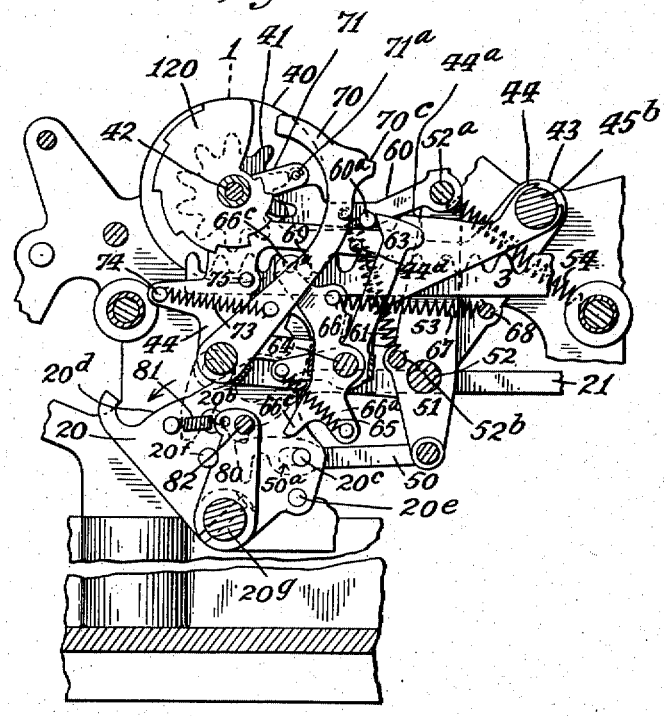

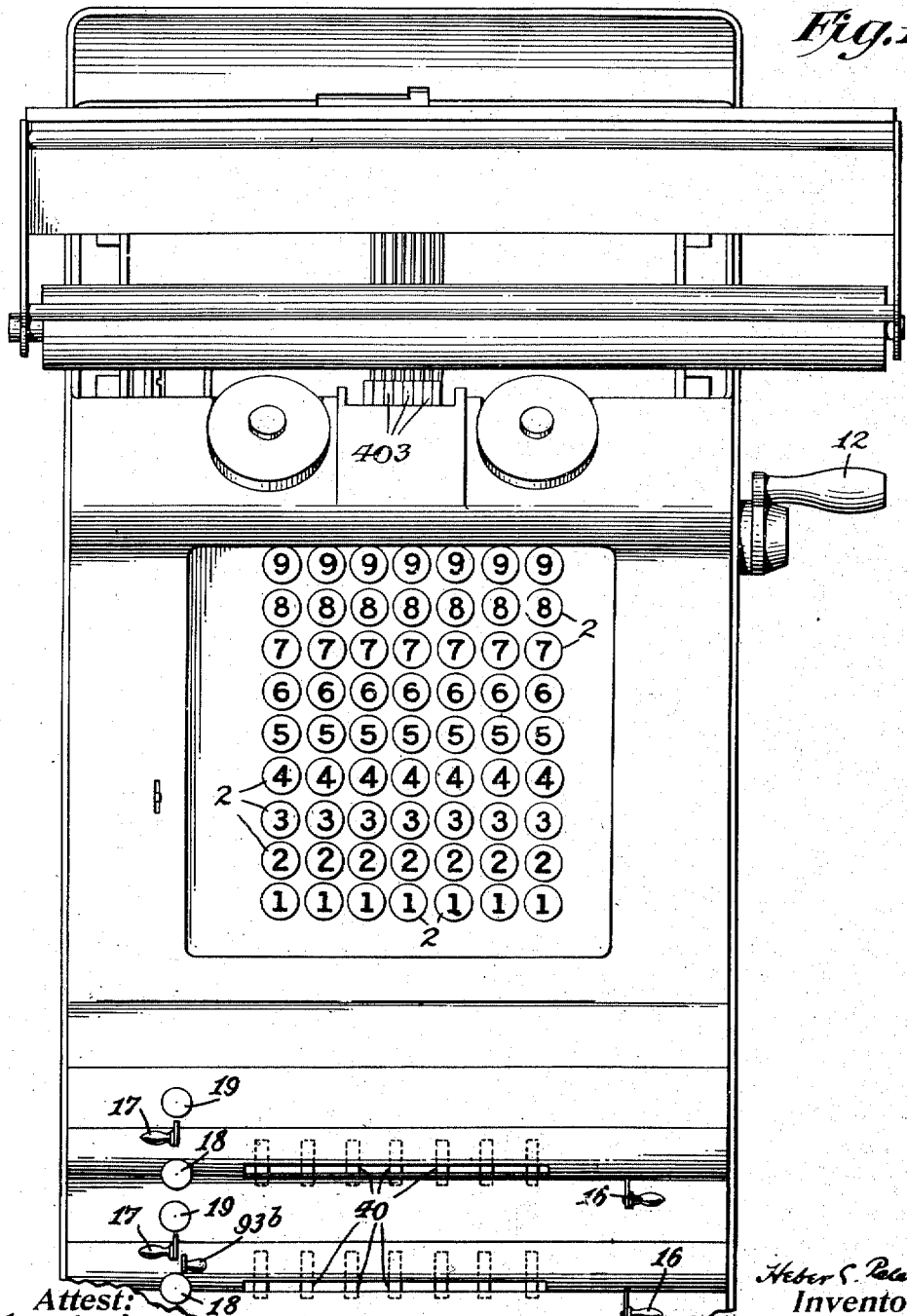

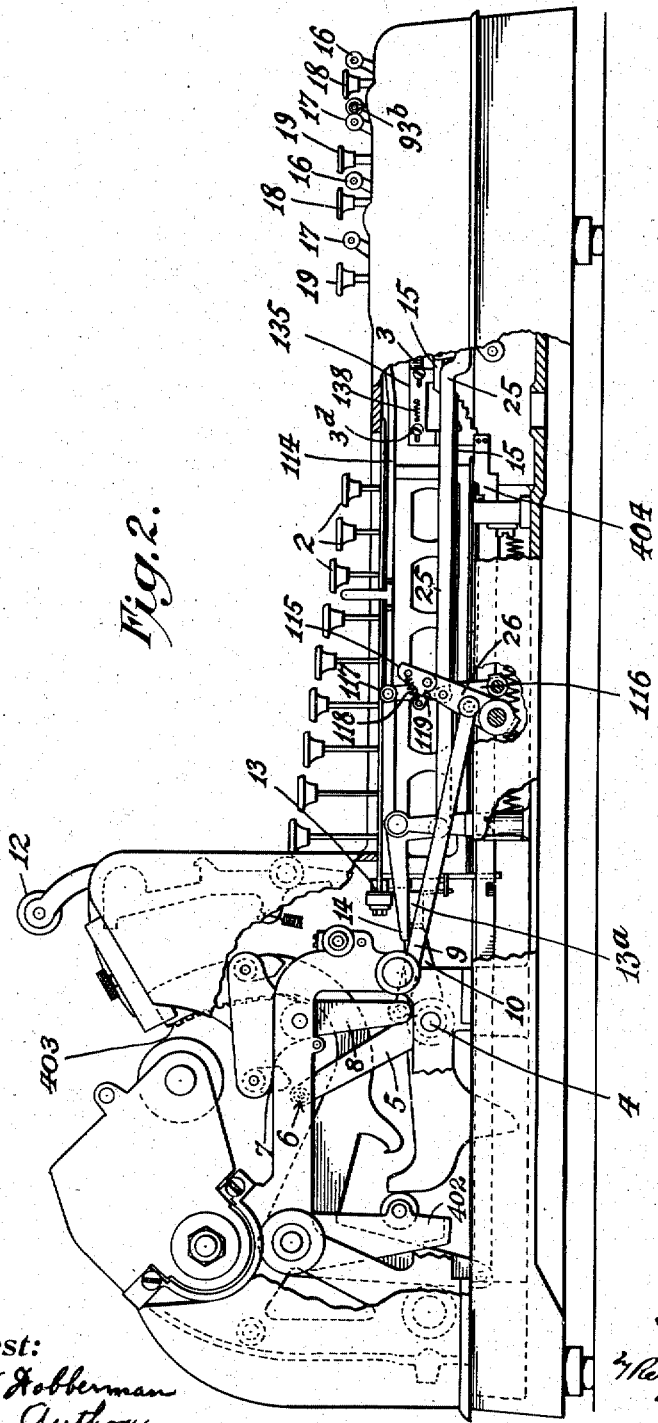

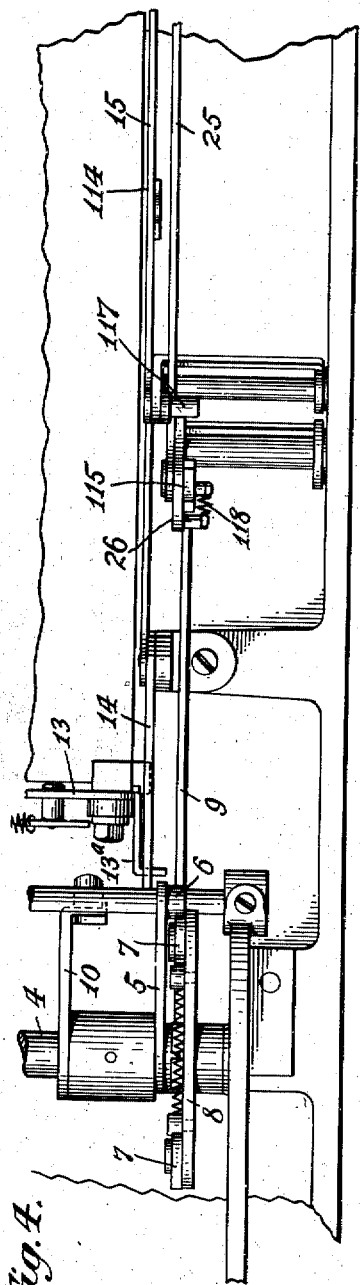
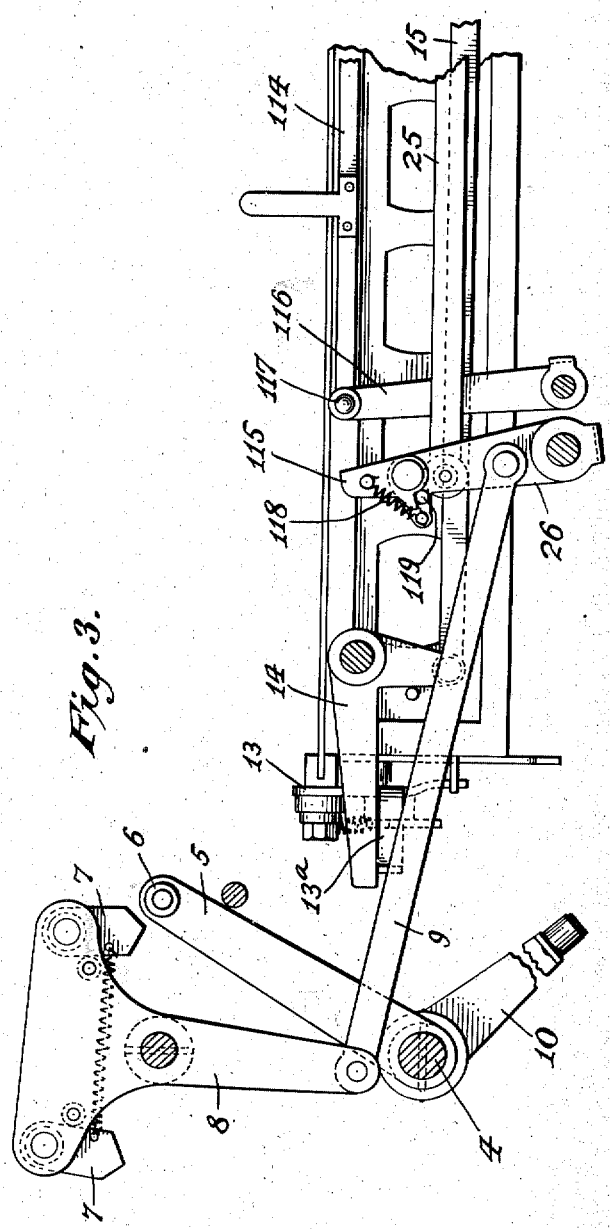

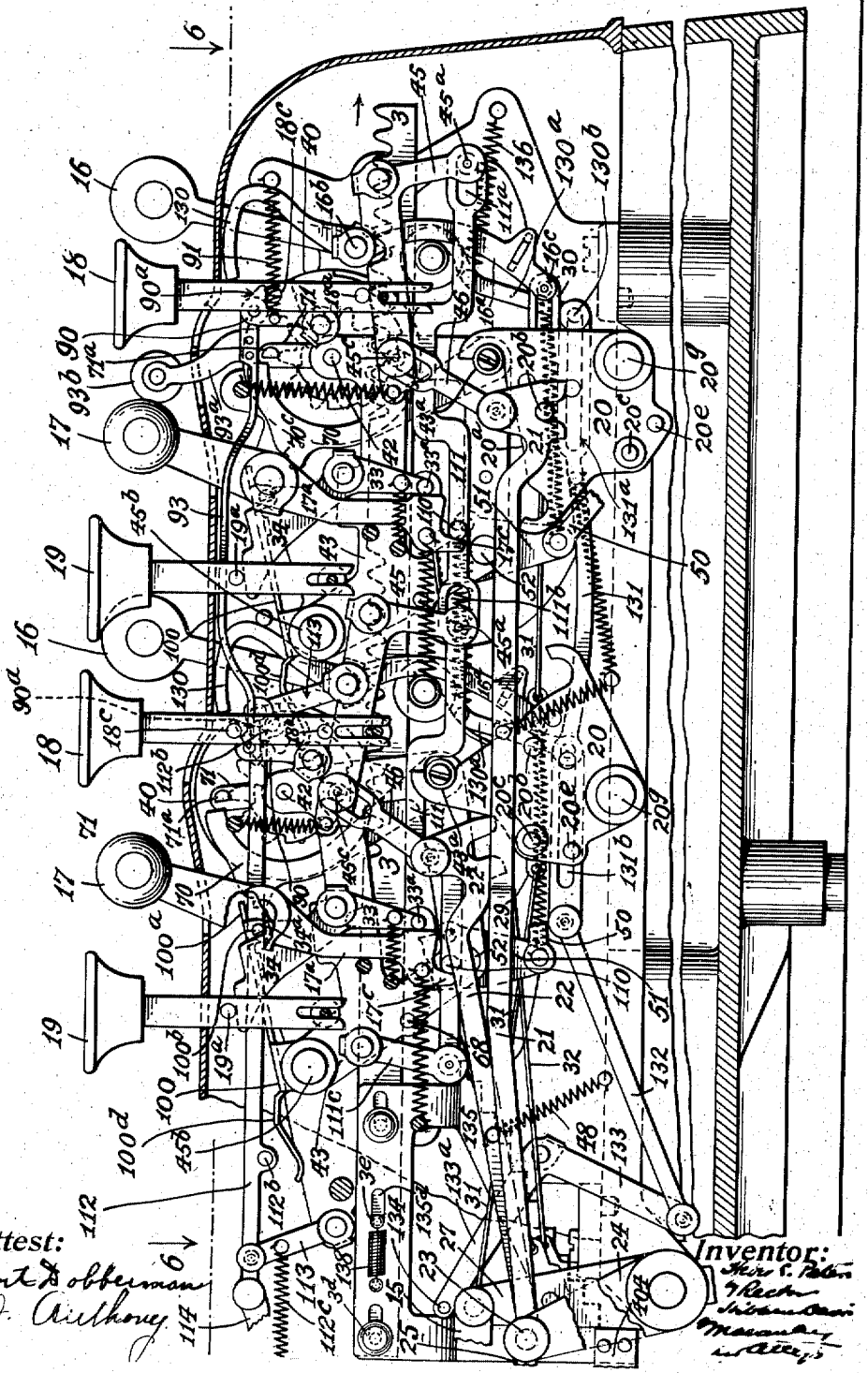

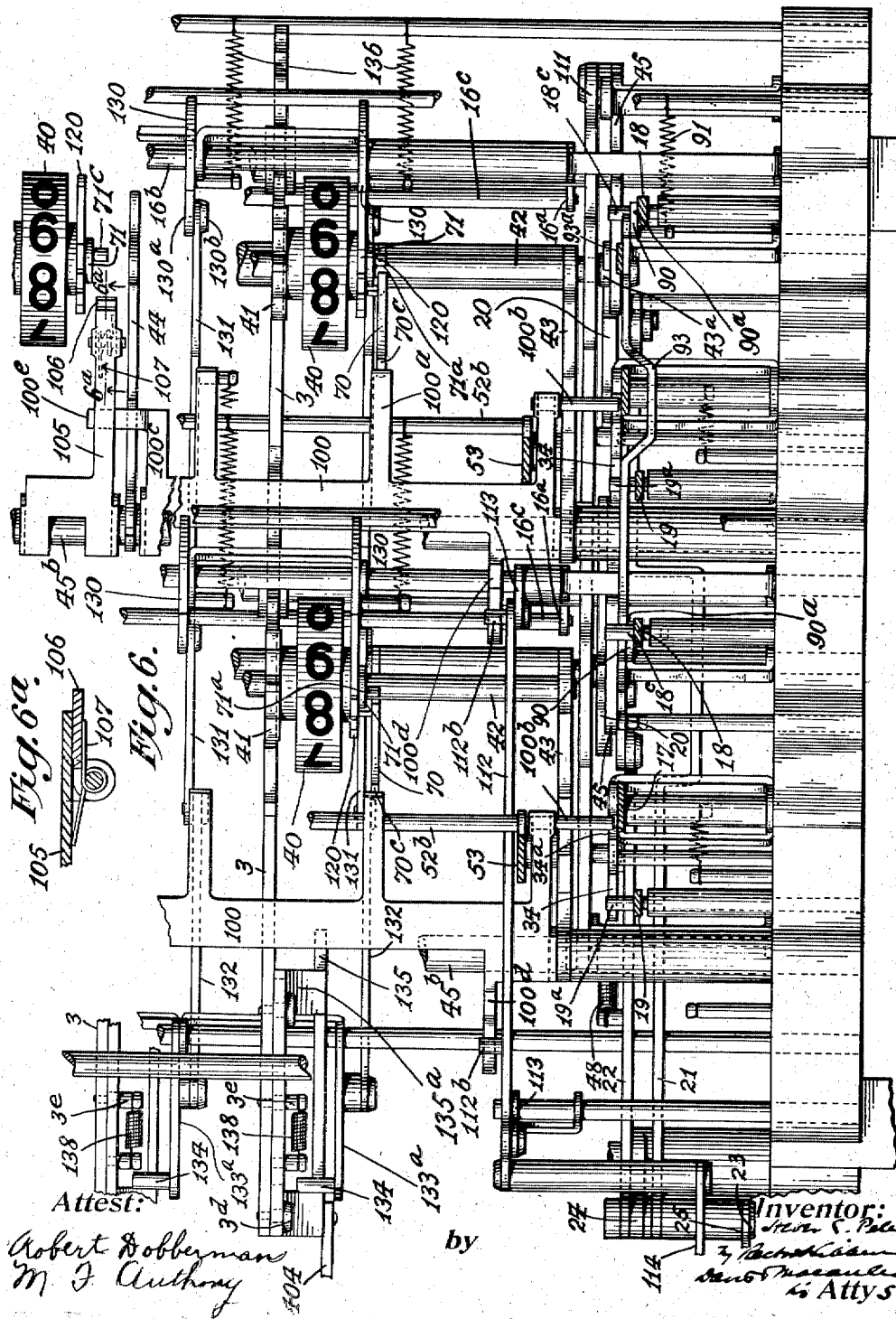

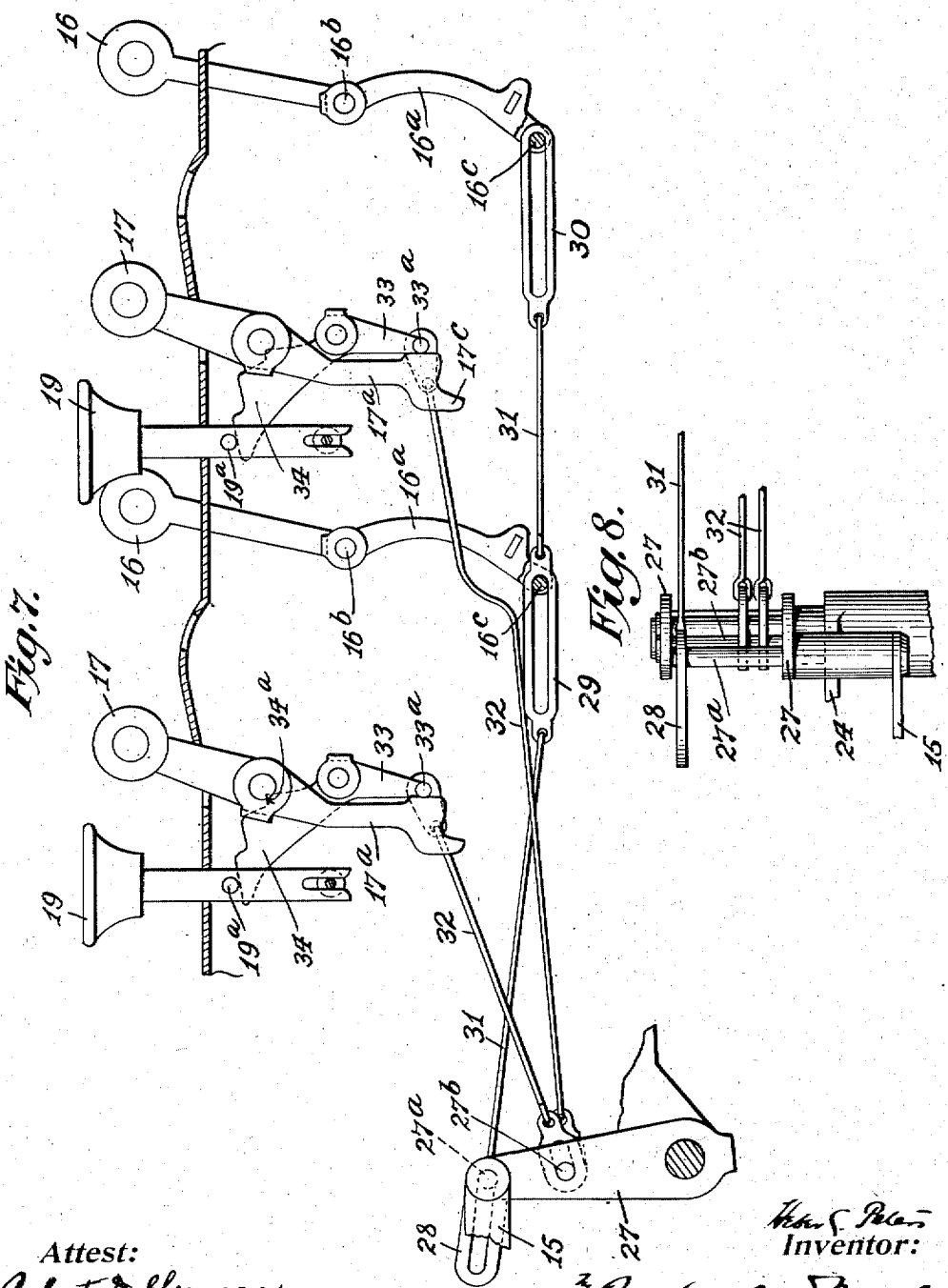

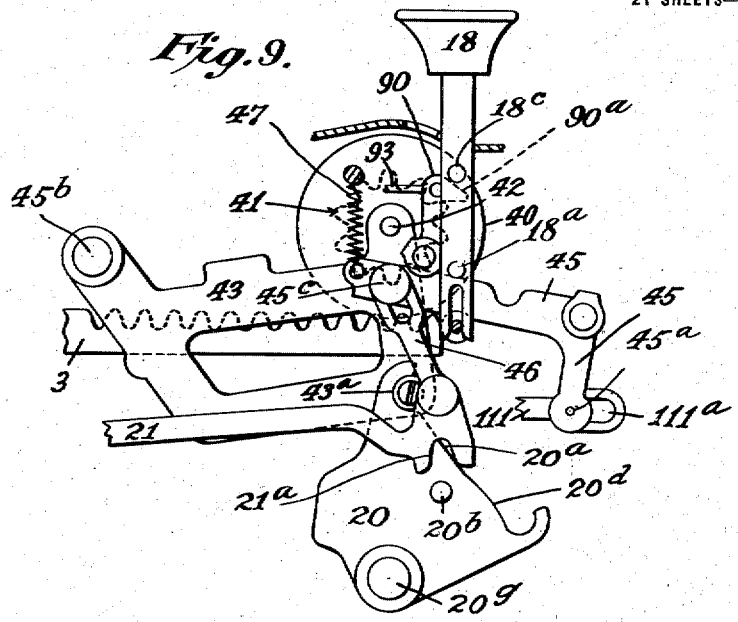
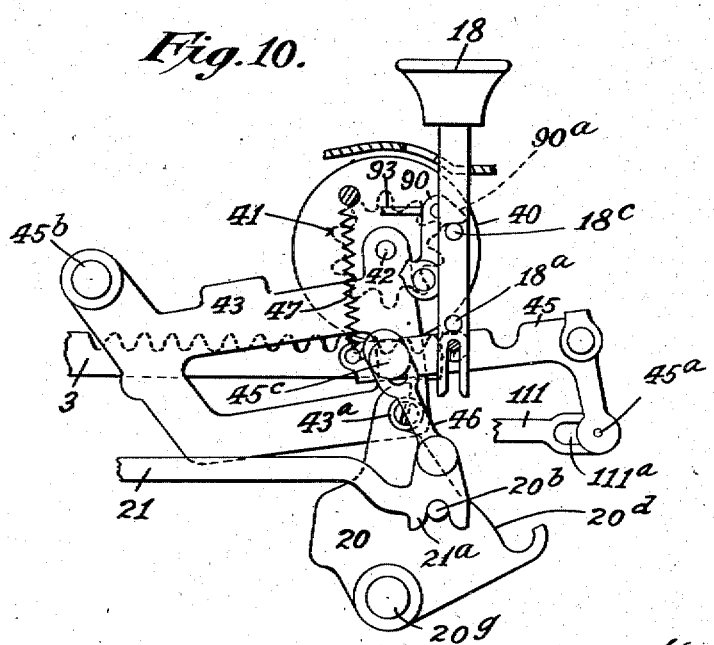

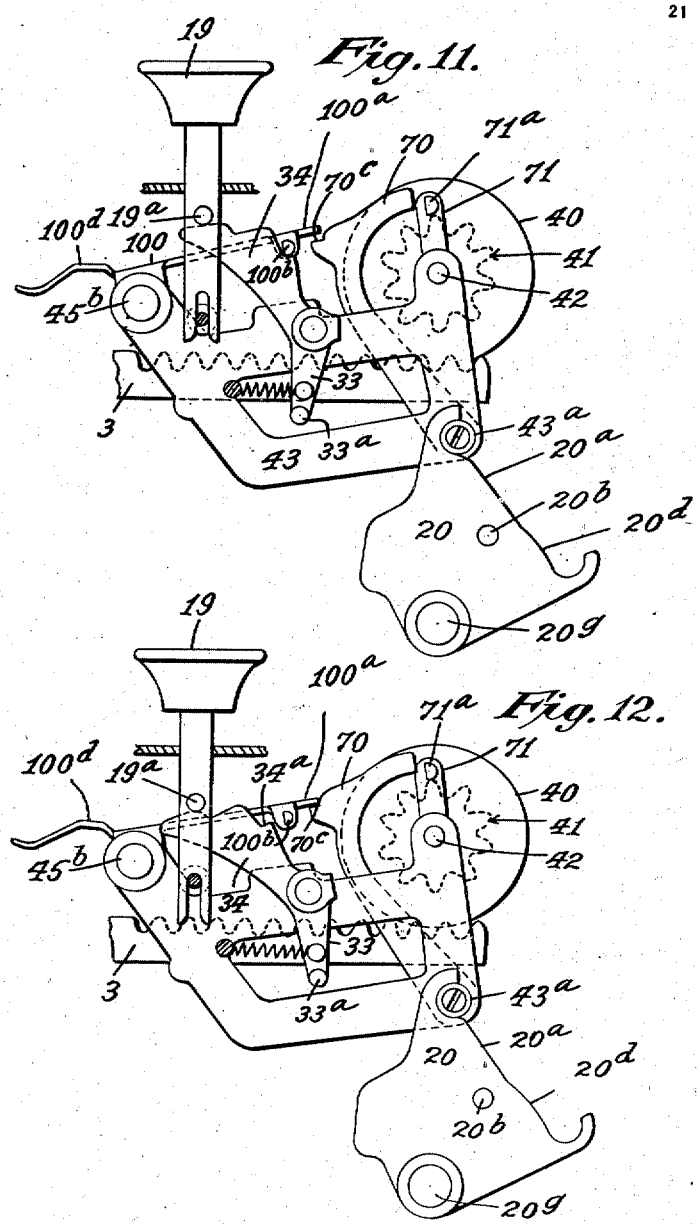

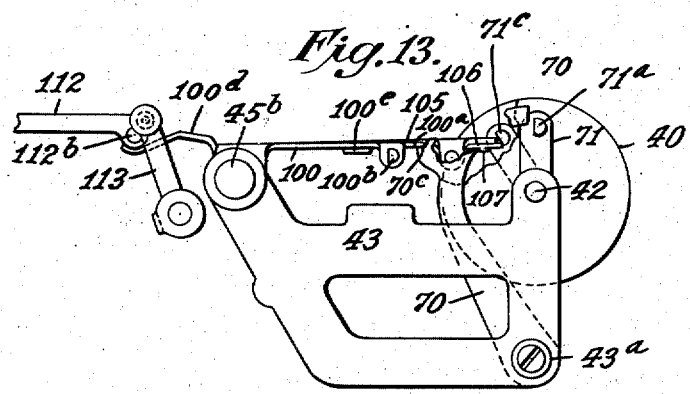
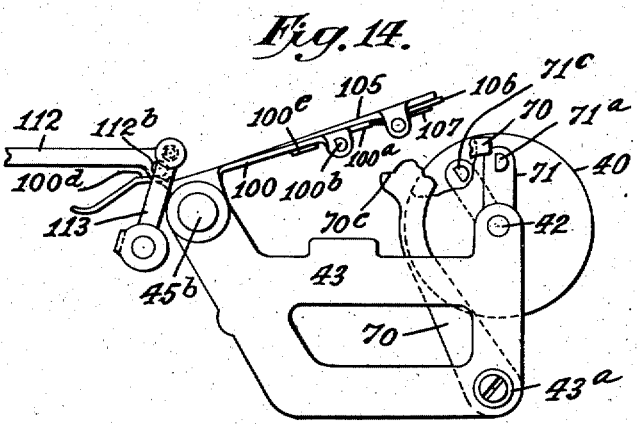

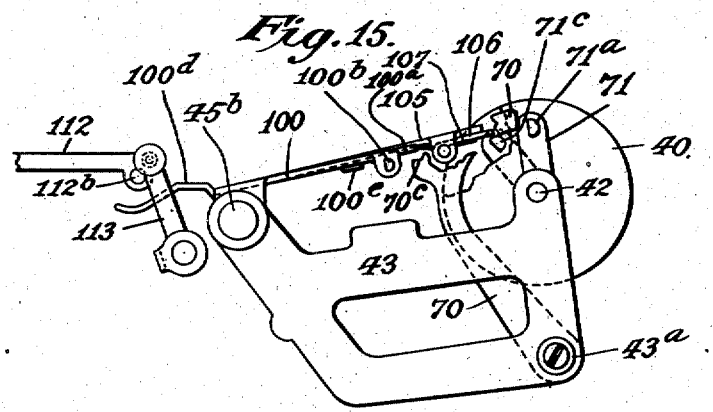
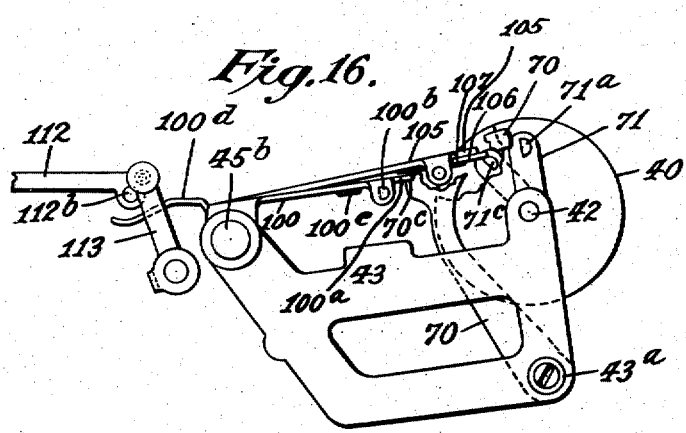
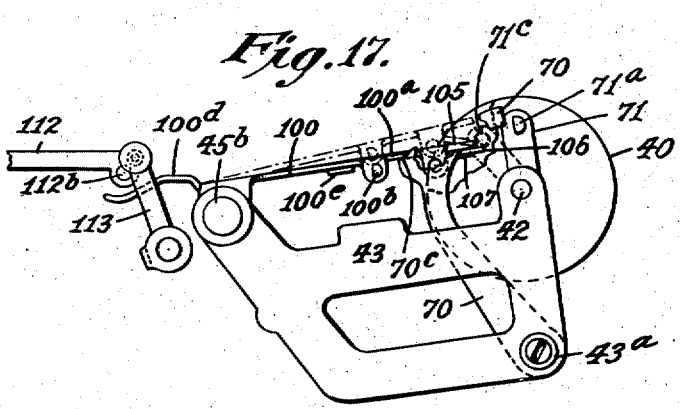

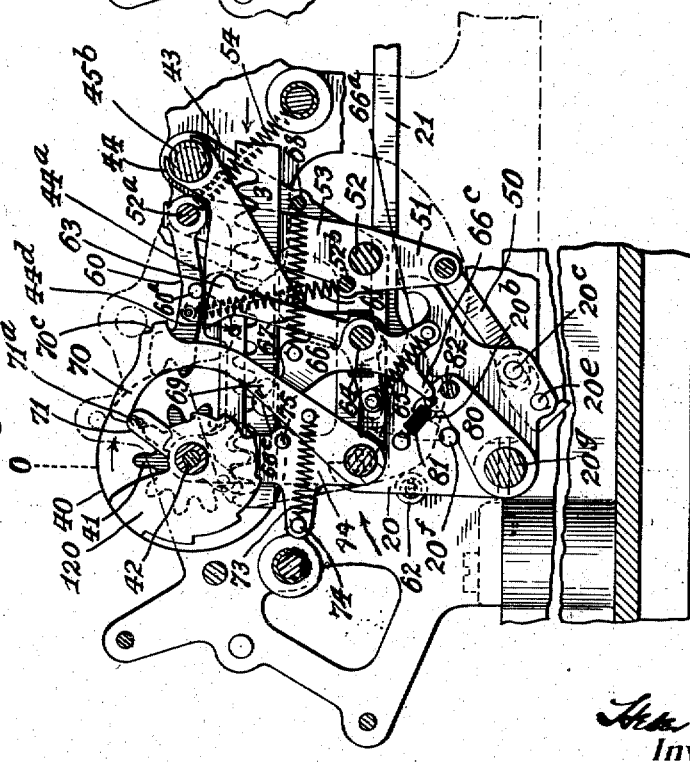

H. C. PETERS.
CALCULATOR.
APPLICATION FILED JUNE 10, 1914.

1,255,568.

Patented Feb. 5, 1918.
21 SHEETS—SHEET 15.

Fig. 24.

Attest:
Robert Dobberman
M. F. Anthony

Inventor:
H. C. Peters
by
his Atty's

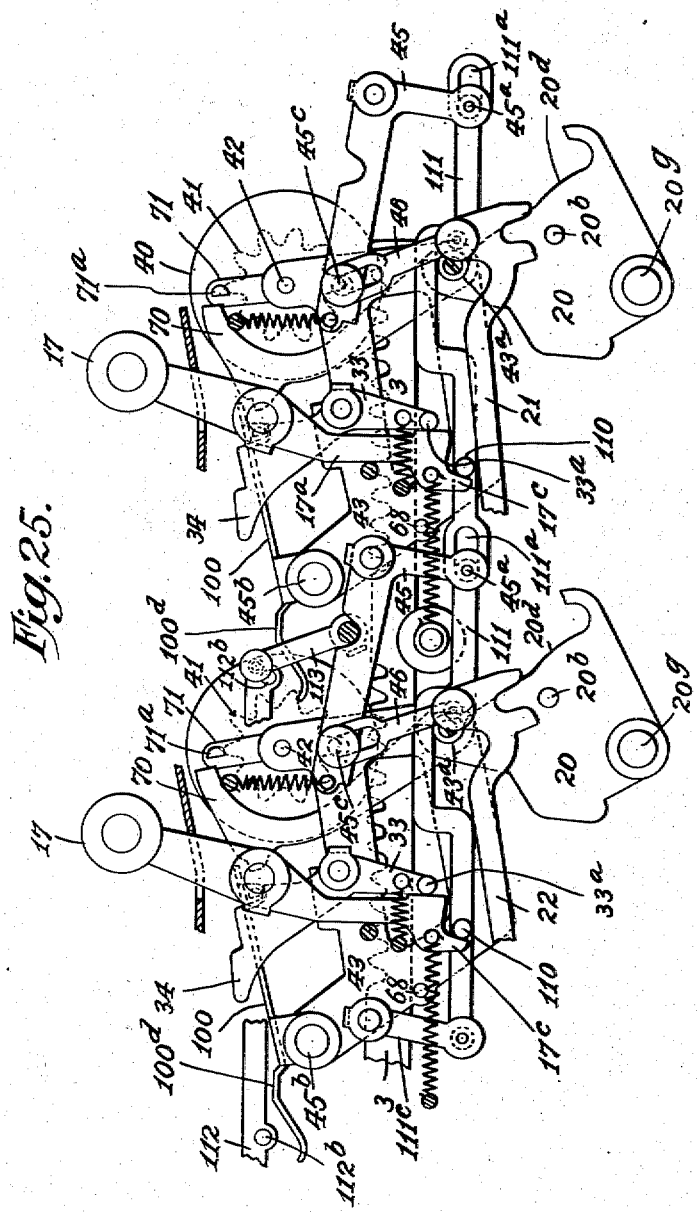

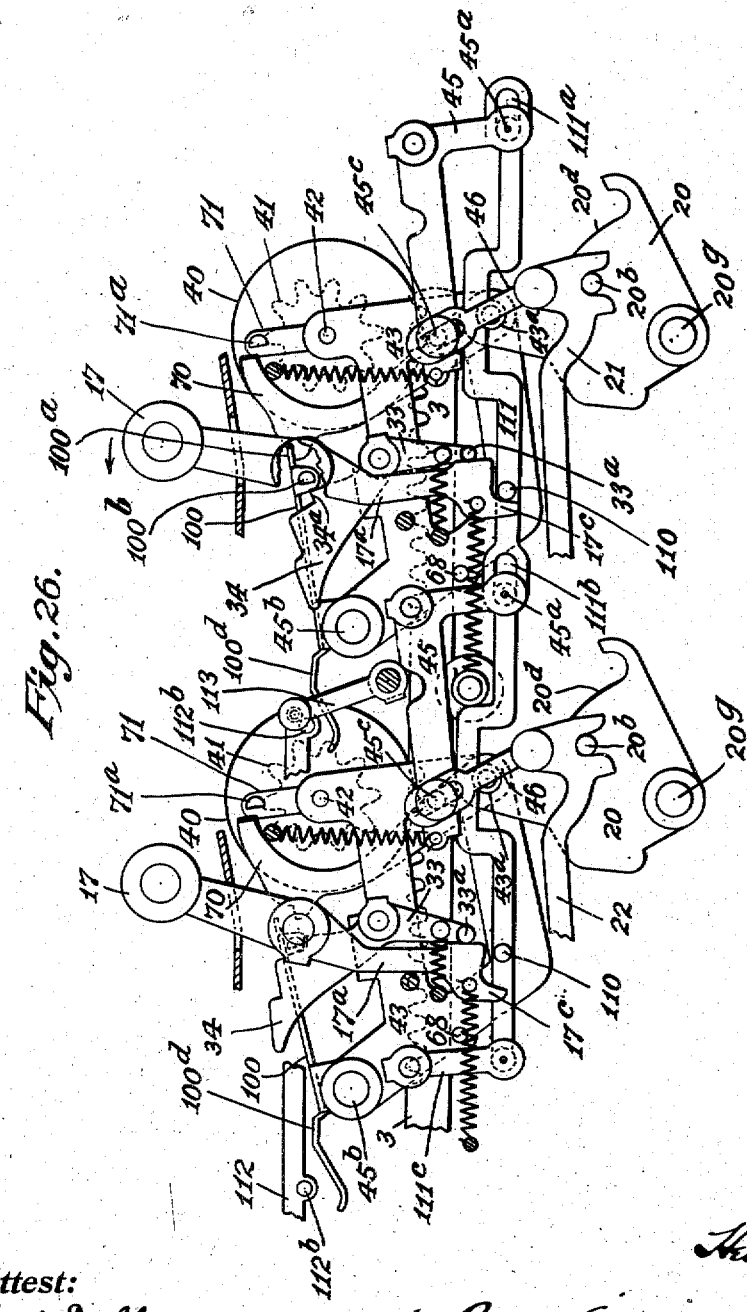

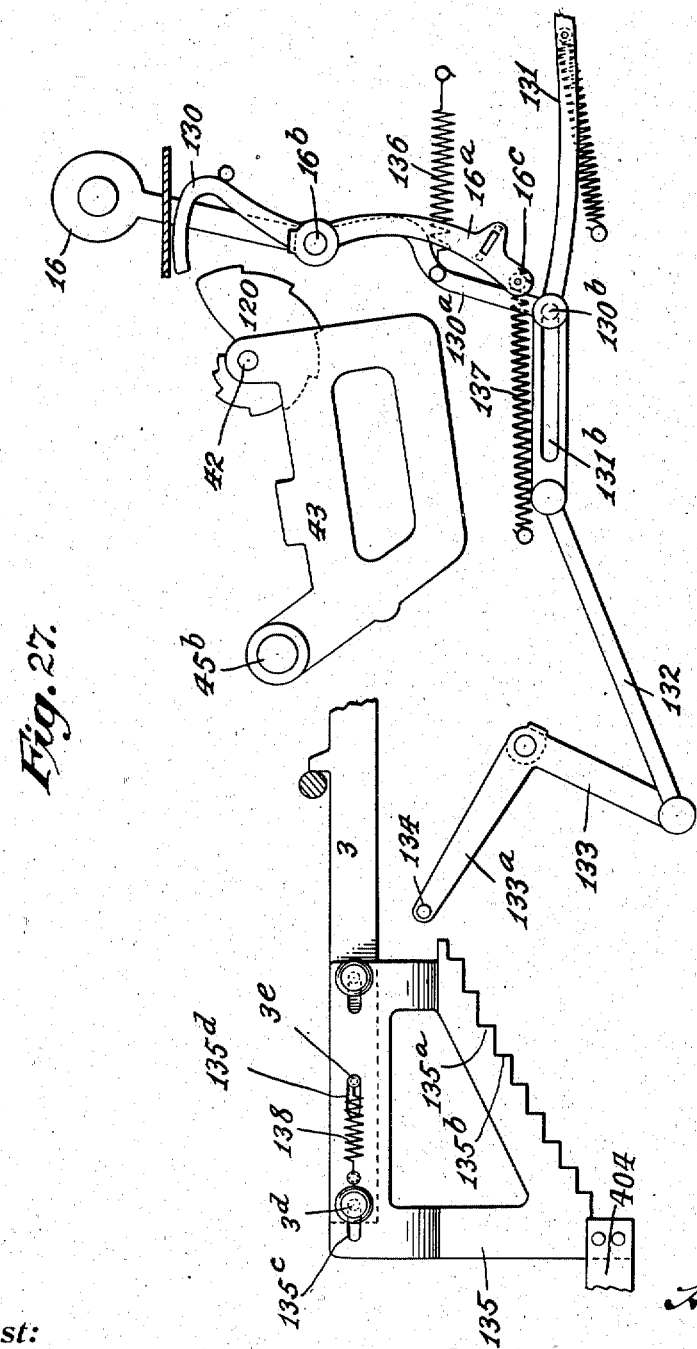

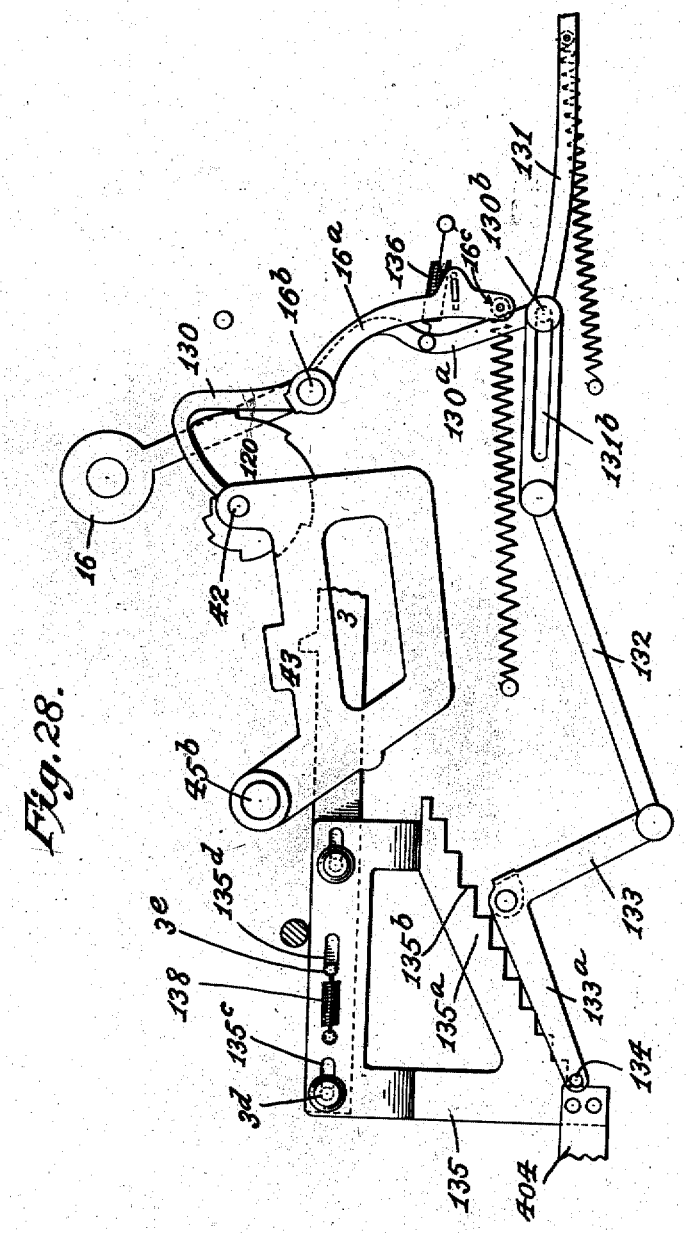

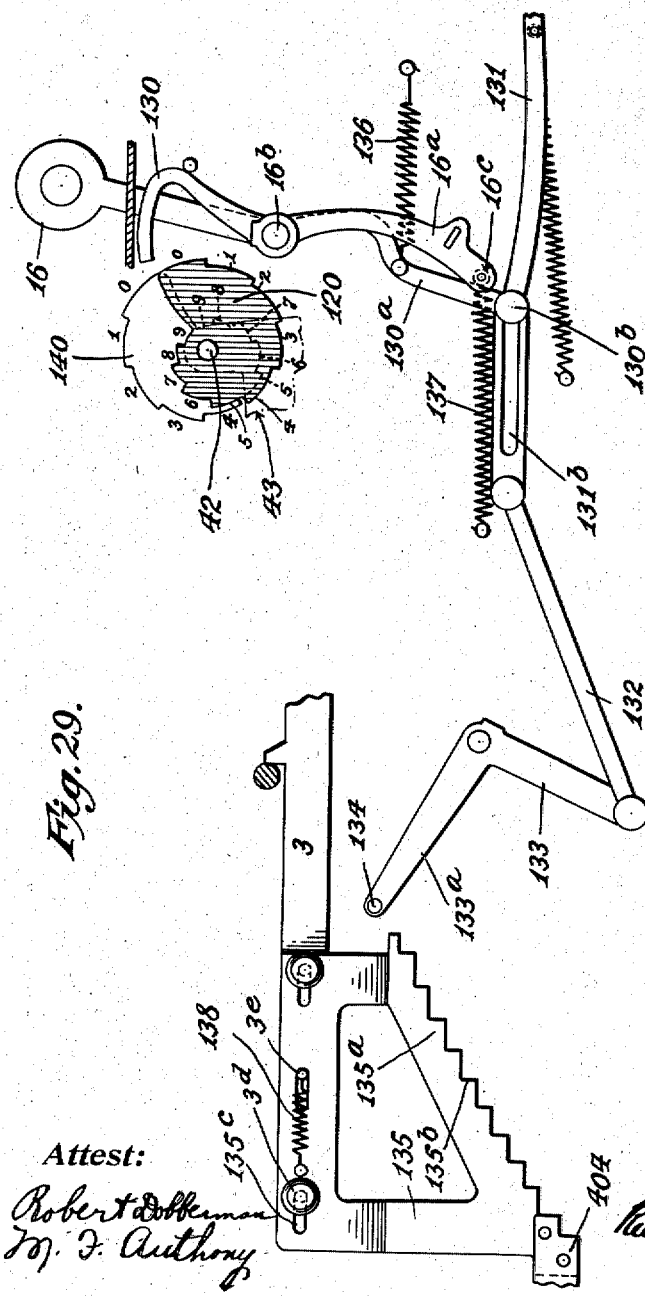

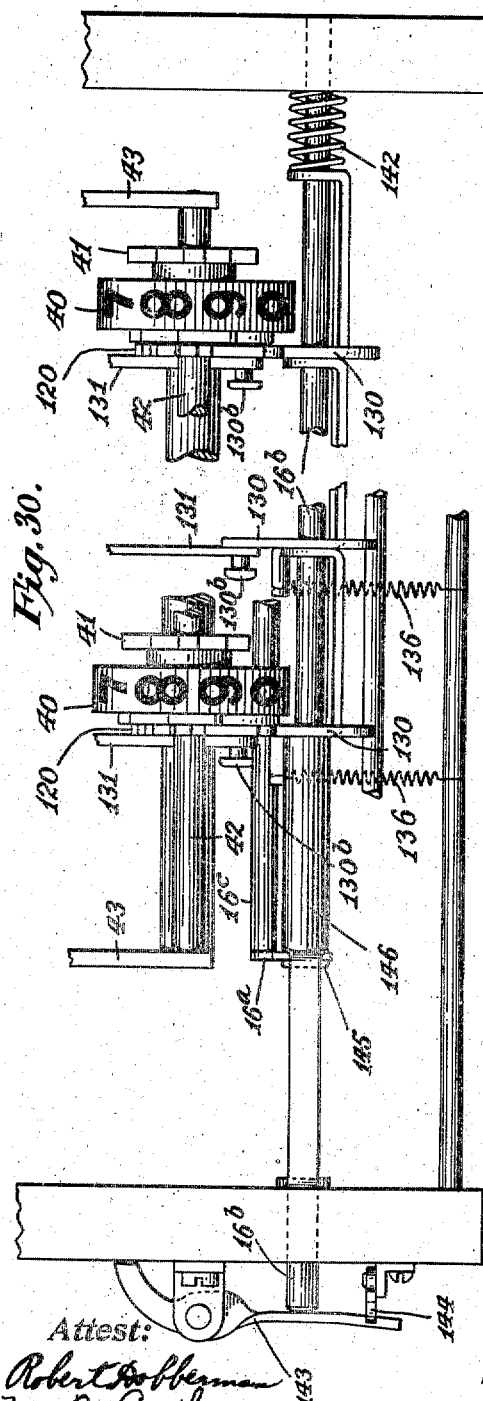

UNITED STATES PATENT OFFICE.

HEBER C. PETERS, OF NEW YORK, N. Y.

CALCULATOR.

1,255,568.  Specification of Letters Patent.  Patented Feb. 5, 1918.

Application filed June 10, 1914. Serial No. 844,150.

*To all whom it may concern:*

Be it known that I, HEBER C. PETERS, a citizen of the United States, residing at New York city, county of New York, and State of New York, have invented new and useful Improvements in Calculators, of which the following is a specification.

My present invention relates to registering and recording machines having capacity for accounting work beyond that of mere accumulation or summing up of successive items or amounts as they are printed. Thus I aim to accomplish improvement in that class of machines which are designed to perform subtraction or the automatic striking of a balance between different accumulations, and to perform work of recapitulation as where separate totals of several series of items are desired and a grand total of all items.

This application discloses and claims a variation of the broad principle described and claimed in my application Serial No. 802,911, filed November 25, 1915, whereby subtraction of amounts accumulated upon an accumulator is secured by adding to said accumulation, the complement of another amount accumulated upon the other accumulator. Another variation of said broad principle is disclosed and claimed in my application Serial No. 31,825, filed June 3, 1915.

One object of my present invention is to accomplish direct subtraction by automatically adding to a minuend-registration upon a set of wheels, the complement of a subtrahend-registration on another set of wheels, which process of subtraction involves turning of both sets of wheels in one direction only and, with proper provisions for stepping the lowest order subtrahend wheel ahead of the higher order wheels and for effecting carries from wheel to wheel of the two sets, is absolutely reliable arithmetically as well as mechanically. Incidentally my invention provides a novel mode of clearing or zeroizing, in that type of machine wherein registering wheels and their actuating racks are engaged during measured movement of the racks in one direction and wherein carries are effected as an accompaniment of or sequence to disengagement of wheels and racks, in which connection, as in connection with subtraction, the wheel of lowest order is made to progress to zero while engaged with its rack, while all other wheels are stopped one step short of zero.

Obviously then my invention has the advantage of simultaneously, or at least in one and the same operation of the machine, effecting direct subtraction by true arithmetical procedure, and clearing or zeroizing of the subtrahend wheels.

As a result of this same relationship of actuators and two sets of wheels, with zero-izing provisions, my invention has the important capacity for work of recapitulation, as, *e. g.*, where successive totals of different groups, or collections of items, are desired, and finally a grand total which constitutes the sum of the several separate or "sub" totals. It will have been clear that the above outlined subtraction process involves the registering upon one set of wheels of the complement of a registration upon another set of wheels, and incidentally the clearing or zeroizing of that other set of wheels. Obviously then one set of wheels can be devoted to the collection of successive series of items, and complements of the totals of the several series can be successively registered and added together upon the other set of wheels. The latter will then contain the complement of the desired grand total, and by then reversing the order of operation, the grand total itself may be registered upon the first set of wheels. The latter stand clear when the last of the sub-total complements has been passed to the other set of wheels, and, with this other set as well as the first set having a complemental-control-equipment of the character already mentioned, forward turning of the same in mesh with the racks will necessarily result in registering the grand total itself upon the first set of wheels likewise in mesh with the racks.

In order that the field I purpose covering may be more readily appreciated, I shall give several concrete examples of arithmetical work such as my invention is adapted to take care of—in describing which I shall assume the use of reciprocating racks as actuators for the registering wheels, and in cases where two accumulators come into play I shall arbitrarily designate them "A" and "B".

Elimination or clearing.

0 0 0 1 4 5 7

Let us assume that on the adding wheels of an accumulator of seven columns capacity, appears as the result of items accumulated a total of 1457. Since the unit adding wheel in the operation of clearing advances to the zero position, it will advance 3 digits and complete its revolution. All other adding wheels will advance to the nine position. This requires that the "tens" adding wheel advance 4 digits; the "hundreds" adding wheel, 5 digits; and the "thousands" adding wheel, 8 digits. Each remaining adding wheel will advance 9 digits. Thus the racks engaging the gears of this accumulator will assume the same relative position that they would occupy if the number 9998543 had been recorded on the keyboard, and the machine operated through its forward stroke only. The sum of 1457 and 9998543 is one unit in excess of the maximum accumulating capacity of the accumulator. Hence the sum of these two numbers produces a total of 10,000,000. Since the accumulator in this case is of but seven columns capacity, the digit to the left will not appear and only the zeros of this total will show on the adding wheels. In this way, the accumulator is cleared.

Subtraction.

0 0 0 1 4 5 7 — A
0 0 0 2 3 2 6 — B

Let us assume that on the adding wheels of accumulator A, there appears, as the result of items accumulated, a total of 1457. That on the adding wheels of accumulator B appears, as the result of items accumulated, a total of 2326. We now desire to secure automatically the arithmetical difference between 2326 and 1457. To "clear" accumulator A requires that 9998543 be added to 1457. If simultaneously with the operation of clearing accumulator A, accumulator B engages the racks, the number 9998543 will be added also to the total 2326 on the adding wheels of accumulator B. The sum of 9998543 and 2326 is 10000869. Since, however, the accumulator B, in this case, is of but seven columns capacity, the digit 1 at the extreme left will not appear. What will appear on the adding wheels of accumulator B is 0000869, which number indicates the arithmetical difference between 2326 and 1457. It is evident that the above operation may be reversed with regard to the relation of accumulators A and B.

Recapitulation.

| Keyboard items. | "B" totals. | "A" complements. |
|---|---|---|
| 165 | | |
| 832 | | |
| 460 | | |
| — | | |
| | 0001457 | |
| | | 9998543 |
| 172 | | |
| 461 | | |
| 654 | 0001287 | |
| — | | |
| | | 9998713 |
| | | ———— |
| | | 9997256 |
| 116 | | |
| 450 | | |
| 197 | 0000763 | 9999237 |
| — | | |
| | | ———— |
| | | 9996493 |
| 0003507 | | |

Let us assume that with accumulator B in operative relation to the racks, there are set up on the keyboard and successively accumulated the amounts 165, 832, and 460. These total 1457. By eliminating this total from accumulator B by the operation of clearing hereinbefore described, and simultaneously allowing accumulator A to engage with the racks during their forward movement only, the number 9998543, which is added to 1457 to clear accumulator B, appears on the adding wheels of accumulator A. Similarly, if items 172, 461 and 654 be then added in accumulator B, the resulting total will be 1287, which requires that 9998713 be added to 1287 in order that the adding wheels of accumulator B may show clear. If this amount 9998713, simultaneously with the clearing of accumulator B be added to the amount 9998543, already in acccumulator A, there will appear on the adding wheels of the latter, as much of the sum of 9998543 plus 9998713 as can be recorded on a seven column accumulator, or 9997256. Continuing this operation, we will assume the successive registering of 116, 450 and 197 in accumulator B, making a total of 763. It requires that 9999237 be added to 763 in order that the adding wheels of acccumulator B may show clear. By the operation previously described, 9999237 will be added to the amount already appearing on the adding wheels of accumulator A, and we have as a total on the adding wheels of the latter, as much of the sum of 9997256 plus 9999237 as can be recorded on a seven column accumulator, or 9996493. At this point, accumulator B will be clear. If we clear accumulator A by the method hereinbefore described, it requires that 0003507 be added to 9996493. If simultaneously with the clearing of accumulator A, accumulator B is brought into engagement with the racks during their forward movement only, the number 0003507 will appear on the adding wheels of acccumulator B. This number 3507, it will be seen, is the arithmetical total of the independent totals 1457, 1287 and 763. By this means is secured a recapitulation of the independent totals previously accumulated in accumulator B.

When the machine performs any of the operations in the manner indicated it is evident that all relations established between the totals accumulated on the different accumulators are brought about by communicating the complements of these totals, and not by the transfer of the totals themselves.

However, it is within the scope of my invention to measure movements of the racks automatically according to the registration itself which stands upon one set of wheels, without any reverse rotation thereof, and to pass such registration to another set. Thus stops may be set as for measuring movements of racks for total printing purposes, without moving the wheels at all but merely causing them to control the rack movements by reason of presenting appropriate abutments of graduated series one for each wheel, whereby the stops are positioned. To effect the registration of this same amount or total upon another set of wheels, it is only necessary to engage the latter with the racks so as to be forwardly rotated thereby when said racks are released to partake of movement as measured by said stops. Then, too, an arrangement of this sort may be made available for subtraction purposes as well, by having the graduated abutments bear a complemental relation to the numerical subdivisions of the associated wheels, or by having the stops bear a complemental relation to the graduated abutments with which they are associated.

Considering these various forms of means, and others that may be available, the pith of my invention may be said to reside in the automatic registration upon one set of wheels of a registration, or the complement of a registration, standing upon another set of wheels, through measurement of movement of actuators by the latter set of wheels.

Figure 23:
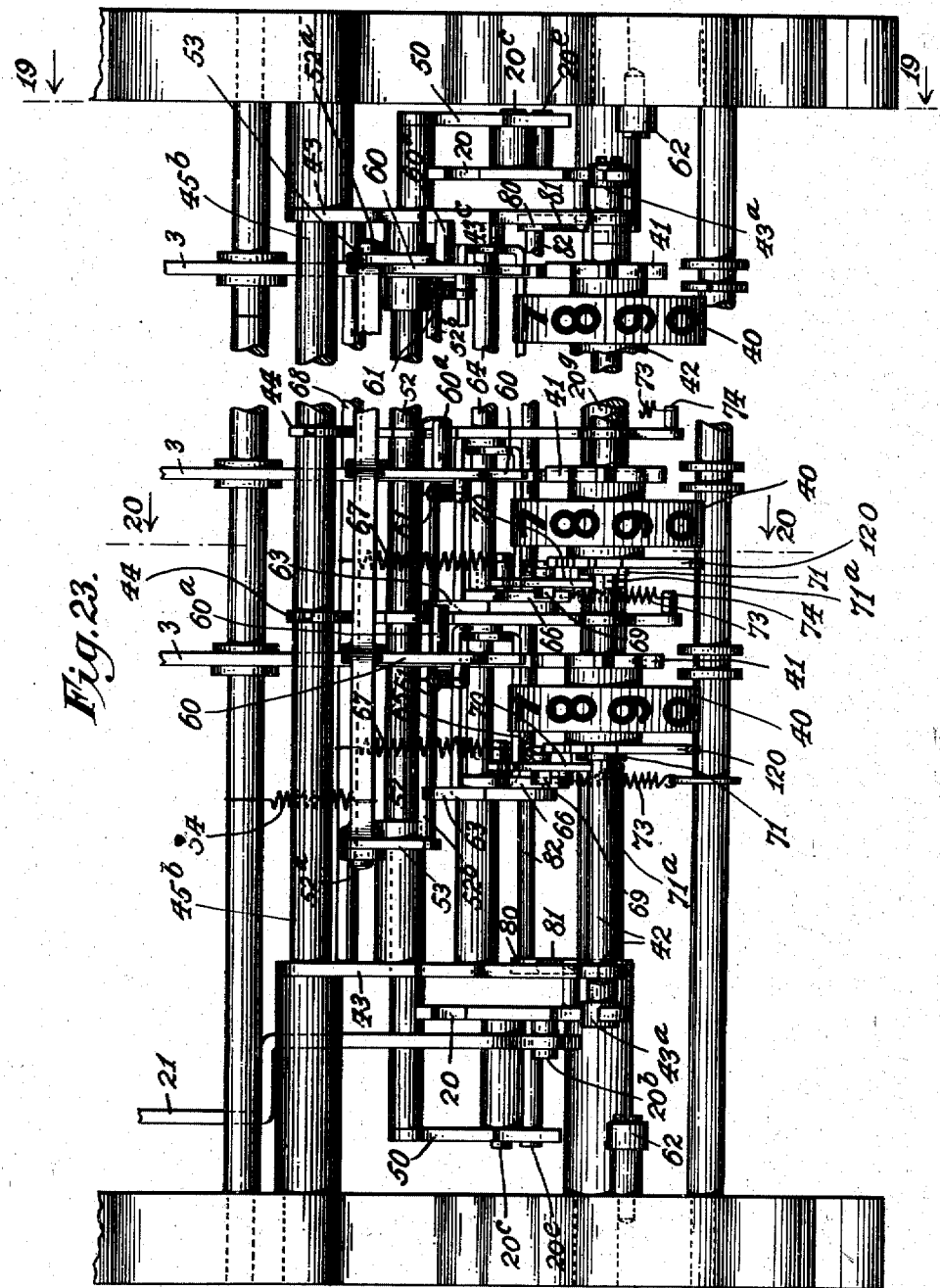

Of the accompanying drawings, which illustrate several forms of embodiment of my invention but without attempting to show all possible forms of embodiment thereof, Figure 1 represents in top plan view a machine embodying my invention in one of its forms; Fig. 2 represents the same machine in side elevation with parts of the casing broken away; Fig. 3 represents, on an enlarged scale as compared with previous figures and at an intermediate stage in operation, certain of the parts which appear in Fig. 2; Fig. 4 shows these parts in plan view; Fig. 5 is a sectionalized left side elevation, on a still larger scale, of the forward portion of the machine comprising duplex accumulating mechanism, and illustrates a condition which exists when the forward accumulator has just received a simple adding registration; Fig. 6 is a sectionalized plan view of this portion of the machine, the section being taken substantially on the line 6—6 of Fig. 5, and the view being of a fragmentary character and condensed; Fig. 6$^a$ is a detail section on line 6$^a$—6$^a$ of Fig. 6; Fig. 7 represents in left side elevation certain special keys and their connections for releasing the actuating racks; Fig. 8 is a top plan view of what appears at the left of Fig. 7; Figs. 9 and 10 are left side elevations of one of the accumulators, Fig. 9 showing the controlling key up and the accumulator therefore disconnected from the shifting mechanism, and Fig. 10 illustrating the said key depressed and the accumulator connected to the shifting mechanism for simple adding purposes; Figs. 11 and 12 are somewhat similar left side elevations, but the key appearing in these figures is one especially provided for clearing or zeroizing purposes and certain devices, omitted for clearness from Figs. 9 and 10, are included in Figs. 11 and 12 since they have to do with the clearing operation; Figs. 13 and 14 are views on somewhat the same order with accumulator wheels broken away to show the units wheel stopping arrangement, Fig. 13 showing a specially constructed stop in action and Fig. 14 showing it withdrawn; Figs. 15 to 17 are similar views illustrating three successive stages in a zeroizing operation which starts with the units wheel at zero and involves a complete rotation of the wheel; Figs. 18 and 19 are right side elevations of one of the accumulators including its carrying mechanism, Fig. 18 representing the normal condition with the lower order wheel registering 9, and Fig. 19 the condition just after the operation starts when wheel pinions have dropped into mesh with their racks; Figs. 18$^a$ and 19$^a$ are fragmentary supplemental views showing certain parts beyond the plane of Figs. 18 and 19; Fig. 19$^b$ shows some of the parts of Figs. 18 and 19 in left side elevation; Figs. 20 to 22 are sectional left side elevations, Fig. 20 showing the condition when the lower order wheel has advanced to zero and the transfer or carrying devices become set for subsequent operation, Fig. 21 the condition when the transfer or carrying operation is on the point of occurring, and Fig. 22 the condition when it has occurred; Fig. 23 is a top plan view of this accumulator broken away and condensed; Fig. 24 shows a portion of the accumulator in front elevation; Fig. 25 is a view on the order of Fig. 5 but confined to such parts as are more immediately concerned in work of subtraction or recapitulation, the parts appearing at normal; Fig. 26 is a similar view illustrating the effect of operating one of the special keys which appear in these views in the form of hand levers; Figs. 27 and 28 illustrate certain parts by themselves which appear in Fig. 5 and are concerned with the printing of totals, Fig. 27 illustrating the normal condition and Fig. 28 the operated condition; Fig. 29 is a view of a similar character which illustrates a modification in the means for registering upon one set of wheels, the complement of a registration upon the other set, this modified construction being worked out upon a principle similar to that of the total printing arrangement of Figs. 27 and 28; Fig. 30 is a fragmentary condensed top plan view of this modified construction; Fig. 31 is an elevation of parts at the left of Fig. 30; Fig. 32 is a detail of the units wheel arrangement of this modification.

General arrangement.

To aid in a ready understanding of my invention by those skilled in the art, and incidentally by way of demonstrating its adaptability to known types of adding machines, I have chosen to illustrate the same in the present instance as applied to a machine having the design of the one known upon the market as the "Burroughs Visible" which machine corresponds in the main with that shown in Patent No. 763,692, issued June 28, 1904, on the invention of William Henry Pike, Jr. My present invention does not embrace novel listening or printing mechanism *per se*, nor does it embrace novel manipulative amount determining devices, and therefore I have simply shown the well known printing mechanism of the aforesaid "Burroughs Visible" machine and the amount keyboard thereof including key detents and releasing means.

It will thus be understood that the amount keys 2 are arranged as usual in denominational rows, and, in accordance with the principle of the aforesaid prior machine, they supply stops for measuring the excursion of rack bars 3 (Fig. 5) which extend from the front toward the rear of the machine and are connected with type carriers 403, being normally held rearward against the tension of springs by detents displaced through depression of said keys, and being restored to the rearward position by a main operating cam, and a bail or yoke. In this prior machine, when adding, as in other Burroughs machines, the adding wheels remain disengaged from the actuating racks during the first half cycle of operation and are then engaged with said racks so as to be turned thereby when the latter are driven back to their normal positions. I employ the old form of means for effecting a periodical shift of wheels into and out of mesh with the actuating racks, but I prefer to have the wheels engaged with the racks during the initial movement or advance thereof instead of during their return movement, and, as hereinbefore stated, a fundamental characteristic of my invention is that the wheels and racks are never engaged for movement of wheels other than in an adding direction. However, in so far as concerns the character of means for effecting the periodical shift, no material departure from that of said prior machines is required, and I have here shown a main drive shaft 4 of the machine proper as equipped with an arm 5 having a roller stud 6 for acting upon wiper pawls 7 of a three-armed lever 8, the said arm 5 being vibrated in every operation of the machine and serving to throw the three-armed lever 8 one way at the beginning of an operation and back again at the beginning of the last half cycle of an operation of the machine, in a familiar manner. Through the medium of a link 9 and other connections, hereinafter pointed out, this action of said three-armed lever 8 is transmitted to one or the other or both of the holders or frames in which the sets of accumulating wheels are carried.

The shaft 4 also carries an arm 10, as heretofore, which serves to release the amount keys at the end of an operation. It will be understood that, as the parts appear in Fig. 3, the operating handle 12 of the machine is forward and the arm 5 correspondingly forward and the arm 10 depressed, the lever 8 having been thrown rearward as to its depending arm at the beginning of the operation and having so remained during the remainder of the forward stroke of the handle. Upon the return stroke thereof the first thing to occur is the shift of the lever 8 forward as to its depending arm (in the former construction with the effect of engaging adding pinions with their racks but in my present construction with the effect of disengaging wheels from the racks), and at the conclusion of this return stroke of the handle the arm 10 effects the key-release in a familiar manner. This is done through vibration of a bell-crank lever 13 which, as in the prior construction, has a rearwardly extending angular arm 13ª though not, as in that construction, acted upon directly by total and sub-total keys for the purpose of effecting key and rack release.

It will have been apprehended that inasmuch as I do not purpose rotating my registering wheels in but one direction, and that an adding direction, the familiar mode of printing totals is not practised in carrying out my invention. I refer of course to that mode of printing totals which consists in rotating wheels backward to zero while in mesh with their racks, the latter being connected to type carriers. Correspondingly there is absent from the present disclosure all such devices as will be found in said Pike patent for varying the coaction between the wiper pawls and the roller stud. It is, however, essential in connection with several uses of my invention that the racks shall be preliminarily released, and any depressed amount keys returned to normal, and therefore I make use of the angular arm 13ª of the release lever 13, in much the same way that it is used in the old construction in connection with the total and sub-total keys thereof. Thus I arrange a bell crank lever 14 with its rearwardly extending arm overlying the laterally-turned portion of said lever arm 13ª, and I connect the depending arm of said bell crank lever 14, through the medium of a link 15, with clearing keys, total keys and keys which serve both for subtraction and recapitulation purposes.

For the accommodation of two complete accumulating structures I extend the front part of the casing of the machine and correspondingly extend the supporting frame work so that two sets of registering wheels may stand one just in rear of the other, the top of the casing being slotted as shown in Fig. 1 so that the numerals of both sets of wheels may be exhibited. I preferably locate the total keys (one for each accumulator) at the right, these taking the form of small hand levers 16. At the left of this forward portion of the casing I preferably arrange similar small hand levers 17 which control subtracting and recapitulating operations, and I also locate in line with these latter hand levers or keys, certain depressible keys, four in number, those two designated 18 being the keys for determining which of the two accumulators is to be used for ordinary adding operations, or whether both shall serve simultaneously in such connection, and the other two keys, designated 19, controlling respectively the clearing of the accumulators.

The keys 18 serve to connect the before-mentioned link 9 with rocker plates 20 (Fig. 5), through the medium of different lengthed links 21 and 22, both of which are pivotally connected at the point 23 with a rocker arm 24, the latter being connected by a link 25 (Figs. 3 and 4) with a pivoted arm 26 to which said link 9 is coupled. The said rocker plates shift the accumulators into and out of mesh with the racks 3, in a manner presently to be described, and in case of using one or both of said keys 18 and not others, the excursion of the racks is regulated in the ordinary way by the stops which the amount keys supply,—racks being released from their detents only in orders wherein amount keys are depressed. This has reference to simple adding operations wherein, according to the arrangement here shown, the racks turn the wheels when said racks are moved forward by their springs into contact with the key-set stops, and the release of keys occurs automatically near the close of the operation in the manner already mentioned.

The other special keys 16, 17 and 19, though having varied functions, yet all come into play in one way or another to cause the exercise of control over rack movements by one or the other set of wheels, which in a sense is the reverse of the sort of control exercised when the keys 18 are used, since the latter primarily provide for control of the wheels by the racks. This difference necessarily affects the matter of release of racks, the latter being primarily released collectively when any one of these other keys designated 16, 17 and 19 is depressed. This is accomplished through the medium of the before mentioned link 15, which is coupled at its forward end to a pivoted arm 27 (Fig. 7) preferably made double through yoke formations (Fig. 8). This double arm is connected by slotted links 28, 29, 30, and wires 31, with arms 16ª of the total key levers 16, which arms extend below the pivots of said levers. The said double pivoted arm 27 is also connected by wire links 32 with depending arms 33 of latch-plates 34 upon which the keys 19 operate through the medium of pins 19ª and upon which also operate the key levers 17, the depending arms 17ª of which bear against pins 33ª projecting from the arms 33 of said latch plates. (The latching function of the latter will later on be pointed out). In so far as the matter of rack release is concerned, it will be obvious that depression of either key 19 will have the same effect as the throwing rearward of the handle of either key lever 17, for the depending arm 33 will swing forward in either case and the arm 27 will be pulled forward. Cross pins 27ª and 27ᵇ between the members of the latter are embraced respectively by the slotted link 28, and slotted pieces 32ª to which the wires 32 are attached.

*Accumulator details.*

Inasmuch as the two accumulators correspond exactly in construction, a detailed description of one of them will suffice for both, though in aid of a more ready reading of the drawings I have applied the reference characters to the elements of each. The wheels themselves are designated by the numeral 40 and there is fastened to each one of them a pinion 41, the wheels and pinions being loosely and independently mounted upon a cross rod or shaft 42 which is sustained in the forward part of a frame pivotally mounted at the rear in the main fixed frame of the machine. Said pivoted frame comprises side plates 43 and intermediate or division plates or partitions 44 (Figs. 5, 6 and 23). The pivot shaft or rod for this frame is designated 45$^b$ and for stability of arrangement the division plates 44 as well as the side plates 43 are engaged with this pivot-shaft as shown in Figs. 20-24.

At the lower forward portion each side plate 43 of the frame carries a roller stud 43$^a$ (Figs. 5, 9, 10, 18-24) which engages the associated shifter plate 20. When the latter is at normal, as shown in Fig. 9, said roller stud seats in a socket just rearwardly beyond a camming edge 20$^a$ of the plate, the rear end of this camming edge being the high part and the accumulator frame being thus normally upheld with the pinions 41 disengaged from the racks 3. Normally also, as illustrated in Fig. 9, a jaw 21$^a$ at the forward end of the link 21 is directly over a stud 20$^b$ on the plate 20 ready to engage the same upon depression of the key 18. The latter is bifurcated at its lower end for guiding purposes and just above the bifurcation has a laterally projecting stud 18$^a$ overlying the rearwardly extending arm 45 of a bell crank lever which near its rear end has a stud 45$^c$ engaging the slot of a link 46 coupled to the link 21. A spring 47 normally upholds the bell crank lever 45 and consequently the key 18 as shown in Fig. 9. A spring 48 connects the link 21 with a frame stud, as shown in Fig. 5, and therefore when the key 18 is depressed and the bell crank arm 45 lowered, as shown in Fig. 10, the jaw of the link 21 becomes engaged with the plate-stud 20$^b$, and consequently in the ensuing operation of the machine, the plate 20 will be rocked rearward and the accumulator pinions will drop into mesh with the racks as the cam edge 20$^a$ of said plate retreats. Gravity alone is not relied upon for this, nor is the mere application of a spring tending to lower the accumulator frame, but the plate is coupled to the frame in such a manner that as said cam-edge retreats the plate exerts power to positively move the frame downward. Thus a short link 50 (whose main function, however, has to do with the transferring or carrying of tens as hereinafter explained) serves in the capacity of a pitman between the plate and frame for insuring full downward movement of the latter. This link has a short slot 50$^a$ (Figs. 18 and 19) at its front end which embraces a stud 20$^c$ on the plate and the link is coupled at its rear end to the lower short arm 51 of a lever pivoted at 52 in the accumulator frame and normally held rearward as to its upper and longer arm 53 by a comparatively strong spring 54 connecting said longer arm with a cross rod of the main frame. As the cam edge 20$^a$ of the plate retreats, the stud 20$^c$ acts against the rear end of the slot 50$^a$ and the link 50 thrusts against the lower short arm 51 of the aforesaid lever which, being held forward by the stout spring 54, does not then turn upon its pivot, with the result that this thrust is effective to insure engagement of the wheels with the racks.

A comparatively short concentric edge 20$^d$ of the plate at the lower end of its cam edge is reached just as the wheels mesh with the racks and just as the link 50 straightens into line with the pivot of the plate. Then as the movement of the plate continues, the spring 54, which up to this point has been held under tension by the link, rocks the lever throwing its long arm 53 rearward and its short arm 51 forward, the latter being no longer backed up by the plate 20 through the medium of the link 50 since the pivotal connection of the latter with the plate has passed over the dead center. This rocking of the lever serves the purpose of unlocking the pinions 40 after they have been fully meshed with the racks. The lever 51—53 is preferably duplicated at the opposite side of the accumulator structure and the two levers united by cross rods 52$^a$, 52$^b$ and 52$^c$ so as to make up a rigidly connected rocking structure to serve for locking and unlocking the pinions.

Toothed locking pieces 60 for the respective pinions are pivotally mounted upon the upper cross rod 52$^a$ of the rocking structure and constitute gear segments for performing the important function of imparting carrying impulses to the higher order wheels, besides the relatively minor function of locking the wheels while out of mesh with the racks. These segments are connected by springs 61 with the middle cross rod 52$^b$, and these springs serve to pull down the segments when carrying impulses are required. This applies of course only to the higher order wheels and not to the units wheel because no carrying impulse is imparted to the latter, though there is a segment 60 for that wheel to subserve the locking function. It is connected by one of the springs 61 to the rod 52$^b$ but does not have any down stroke, its stud 60$^a$ (Fig. 23) simply riding back and forth on a laterally turned flange or shelf 43$^c$ of the adjacent side piece 43 of the accumulator frame.

The condition when the plate 20 has been fully rocked to put the pinions in mesh with the racks is illustrated in Fig. 19, and it will be observed that the segments 60 have been withdrawn from engagement with the pinions so that the latter are free to be rotated by the racks 3. In the ordinary adding operation such as is now being considered all racks released by depression of amount keys will move forward during the further forward pull of the operating handle and until stopped by encounter with the key-stems, then upon release of the handle and its start rearward, the plate 20 will be rocked forward again, with the effect of first rocking the lever-structure 51—53 to engage the segment 60 with the respective pinions and then lifting the accumulator frame by the action of the cam edge 20ª of the plate upon the roller stud 43ª of the accumulator frame. Following this the racks will be restored to normal while disengaged from the pinions.

In order to insure the stability of the condition during this return of racks to normal, i. e., the maintenance of the wheels out of mesh with the racks, the before-mentioned socket or notch is formed at the front upper part of the rocker plate 20, and the latter is given sufficient movement to engage that notch fully with the roller stud 43ª after the rise of the accumulator frame is over. In this way the cam edge of the plate is carried past the center of the roller stud and the latter then becomes so seated as to have no tendency to rock the plate backward. It is preferable that this excess movement of the plate be not communicated to the link 50, in order to avoid affecting the proper meshing of the segment 60 with the pinion. This is the occasion for the short slot 50ª in said link. The latter extends somewhat beyond the stud 20ᶜ and is adapted to abut against a roller stud 62 on the main frame, as shown in Fig. 18. The end or nose of the link strikes said stud just as the end of the cam edge 20ª of the rocker plate completes its work of lifting the accumulator frame. In the slight continued motion of the plate its stud 20ᶜ traverses the said slot 50ª. Said link is preferably formed as a hook 50ᵇ in its portion extending forward of the slot, which hook is designed to engage a stud 20ᵉ on a lower rearward portion of the plate under rocking of the latter in a direction to engage the pinions with the racks and when the link has passed the dead center. In further rocking of the plate the stud 20ᵉ acting against the hook assists the spring 54 in withdrawing the segment 60 from the pinions. This occurs during the traverse of the concentric plate-edge 20ᵈ under the roller-stud 43ª after the pinions have come into mesh with the racks.

The above described arrangement of shifter plate 20 and link 50 is preferably duplicated at the right hand side of the machine though no duplicate link 21 is found necessary—the plates being secured to a rock shaft 20ᵍ.

Carrying Mechanism.

Referring next to the matter of transfers, or the carrying of tens, the segments 60 of all orders except the units, having for their main function the imparting of carrying impulses, are normally kept elevated on their pivots in opposition to the springs 61. Thus each of said segments has a laterally projecting pin or stud 60ª which rides upon an elevated edge 44ª of the adjacent division plate 44, and upon the upper edge of a prop 63 which is pivoted on a stud 64 at the lower middle portion of the accumulator frame, and is somewhat widened at its upper end to provide the desired extent of support for the segment. Normally this prop is held forward against a stud 44ᵈ, (Fig. 19) and in the backward and forward motion of the segment the stud 60ª thereof rides off the prop-edge onto the division plate edge 44ª and then rides forward from the latter onto the prop-edge again. The prop has a branch 64ª extending forward from its pivot and connected by a spring 65 with a lower rearwardly directed branch 66ª of a latch 66 which is pivoted on the same stud 64 as said prop and which has a laterally turned ear 66ᵇ engaging the front edge of the prop (Figs. 18 and 19ᵇ). It will be seen that the said spring 65 holds this edge of the prop and the laterally turned ear in contact with each other and that a rearward movement of the latch as to its upper branch will move the prop rearwardly and thereby withdraw a portion of its top edge from service for supporting the segment.

The idea is that when a lower order wheel passes from "9" to "0" such withdrawal will take place so that in subsequent advance of the segments into mesh with their pinions, the stud of the next higher order segment will ride off the top edge of the underlying prop, and therefore, when the pinions are unmeshed from the racks, this segment, under actuation of its spring 61, will drop an extent sufficient to advance its pinion one step. This will be measured by the encounter of the stud 60ª with the low edge of the division plate forward of the before-mentioned raised edge 44ª (Fig. 22). Between these raised and lowered edges there is an inclined edge 44ᵇ, (Fig. 19ª) the purpose of which will presently be pointed out.

A spring 67 connects the latch 66 above its pivot with a cross rod 68 at the rear part of the accumulator frame, and this spring tends to pull the latch rearwardly and bring about the last mentioned condition but is normally restrained from so doing by reason of the contact of the nose 66ᶜ of the latch against a half round stud 69 (Fig. 19ᵇ and dotted lines Figs. 18 and 19) upon a transfer-tripping member 70 in the form of an arm pivoted concentrically with the roller stud 43ª. The upper portion of this arm is curved in conformity with the associated numeral wheel and there is rigidly fastened to the latter an arm 71 which carries a stud 71ᵃ for contact with the forwardly-facing end or edge of said arm. A spring 73 connects said trip-arm with a stud 74 on a forward extension of the adjacent division plate 44 and holds it up against another stud 75 on said plate.

The normal condition is shown in Figs. 18 and 18ᵃ wherein it will be observed that the stud 60ᵃ is resting upon the top edge of the prop 63 near the forward portion thereof and the segment is in mesh with the wheel, serving to lock the same while disengaged from the rack. Fig. 19 shows the wheel in mesh with the rack and the segments withdrawn, and Fig. 19ᵃ shows the stud 60ᵃ of the tens segment then resting upon the raised edge 44ᵃ of the division plate. In these views the unit wheel is at the "9" position so that any further movement of the wheel will trip the transfer. Figs. 20 and 21 show conditions when such movement has taken place, the stud 71ᵃ of the units wheel having struck and passed just under the end of the trip arm 70. The thus caused rearward swing of the latter is sufficient to take its stud 69 back of the catch-shoulder of the latch 66 so that the latter springs over it (under actuation by spring 67) and throws back the prop 63. At the time this occurs the tens pinion is engaged with its rack and the segment 60 is of course withdrawn and resting upon the raised edge 44ᵃ of the division plate, so that the mere throwing back of the prop has no effect to release the segment for downward movement.

When the first half cycle of operation is over and the operating handle starts rearward and the rocker plate 20 swings forward, then the segment is advanced, as before explained, in that portion of the movement wherein the concentric edge 20ᵈ of said plate passes under the stud 43ᵃ. With the prop thrown back this will carry the stud 60ᵃ forward of the point of the prop-head, as illustrated in Fig. 21. When therefore the accumulator frame is elevated in the further movement of the rocker plate and the pinions disengaged from the racks, the spring 61 takes effect to lower the segment as illustrated in Fig. 22, and advance the tens wheel.

Of course a carrying impulse received by one wheel may occasion a transfer or carry to the next wheel and so on, in which case the pinions would already be disengaged from the racks and the segments engaged with the pinions, so that the throwing back of the prop in such a case would immediately result in action of the associated segment to turn the wheel. It will be noted that practically the entire last half cycle of operation is available for the carrying occurrences which is a distinct advantage since ample time for such occurrences is extremely important and has represented a somewhat serious problem in adding machines generally.

For resetting the transfer mechanism there is pivoted concentrically with the rocker plates a pair of arms 80 connected to the plates by springs 81 which normally hold said arms against studs 20ᵗ on the plates as shown in Fig. 20. Said arms are united by a cross-rod 82 which in the rearward movement of the plate wipes past horns 66ᶜ formed on the lower arms of the aforesaid latches 66 and takes up a position in rear of the same as shown in said figure of the drawings. Normally the displacement of the latches by this rod is negligible since the catch-ends or noses are simply drawn back away from the studs 69 and returned to engagement with the under side thereof by the spring 65. (The props 63 do not partake of any movement because they are up against studs 44ᵈ of the accumulator frame which limit their forward movement). In the forward or return movement of the rocker plates, the rod 82 encounters the said horns 66ᶜ, as shown in Fig. 21 and the springs 81 stretch while the plates move on, but as the accumulator frame rises, carrying the latches with it, said rod escapes past the ends of the horns. Then in the next ensuing operation of the machine when the rocker plates move rearward and the accumulator frame lowers, the said rod acts against the forward sides of said horns and retracts the latches. In the event that any one of the latter has been in action holding back the associated transfer trip arm 70, this arm will be released and spring forward to position for coaction with the wheel sud 71ᵃ.

As to resetting of any segment that has dropped to effect a carry, this also occurs in connection with the first part of a subsequent operation and accompanies the withdrawal of the segment from engagement with the pinion. The before-mentioned inclined edge 44ᵇ of the partition plate comes into play in this connection. Thus the stud 60ᵃ having dropped into contact with the lower top edge of said plate and in front of the forward edge of the prop, as shown in Fig. 22, then when the segment is moved rearwardly said stud will force back the prop (stretching the spring 65) and ride up said inclined edge 44ᵇ to the raised edge 44ᵃ of the partition plate, and in so doing escape past the point of the prop whereupon the latter springs forward to support the segment in its next forward movement.

As to the wheel of highest order, the arm 70 associated therewith does not of course have a transfer-tripping function, since there is no wheel to take the transfer, but this arm serves a purpose in connection with the clearing of the accumulator, as will hereinafter appear. As there is no adjacent division plate the spring 73 applied to said arm, is attached instead to a forward cross-rod of the main frame as shown in Fig. 23.

*Selective arrangement of accumulators.*

It will be clear that with two accumulators of the above description arranged as shown, one behind the other, or for that matter, otherwise arranged for coöperation with reciprocating racks whose movements are measured by amount-key stops, either one may be employed for the purpose of accumulating successive items or both may be employed together. However, my invention is not particularly concerned with the simultaneous employment of accumulators in such manner, and I prefer to arrange for a release of one of the keys 18 when the other is depressed. Similar latch arms 90 are arranged in connection with each of these keys as shown in Fig. 5, said arms having at their upper ends beveled catches 90$^a$ for coöperation with studs 18$^c$ on the key stems (Figs. 5, 6, 9 and 10). A spring 91 is applied to the forward latch arm 90 to enforce its engagement with the stud of the forward key 18, and according to the present arrangement this spring serves for the rear latch as well because I preferably connect the two latch arms by a link 93. Obviously with this arrangement the depression of one key (e. g. the rear key in Fig. 5), by forcing rearward its latch arm, will withdraw the forward latch arm engagement with the forward key 18, and release the latter. In order to provide for optional release of the keys after they have been set down, an arm 93$^a$ is fastened to the link 93 and protrudes through a slot in the casing and is equipped with a handle 93$^b$, as shown in Fig. 5.

By putting down both keys 18 at once, both will be latched down and both accumulators thus rendered active, and this may be availed of for work of recapitulation, if desired, for obviously successive series of items may be simultaneously summed up on both accumulators and only one cleared between series so that a grand total is collected on the other. This of itself presents no novelty as a broad proposition. I merely mention it by way of indicating extent of "flexibility" of my machine.

*Clearing or zeroizing.*

I clear or zeroize either set of wheels by turning the same forward to zero, the higher order wheels being first moved to the "9" position and then moved on to zero through operation of the carrying mechanism which operation is inaugurated by the movement of the units wheel to zero, and in the event that the latter wheel is standing at zero in the beginning, it is given a complete rotation.

I find it convenient to utilize the transfer trip arms 70 and the wheel pins 71$^a$ of higher order wheels for the purpose of stopping these wheels at "9". To this end I arrange for blocking rearward movement of said trip arms so that the said studs or pins cannot displace them and pass beneath them as in the case of carrying, but of course I arrange for a release of these trip members in time to permit of the necessary carries occurring to move the higher order wheels to zero. As to the units wheel I make use of a similar wheel stud 71$^c$ but here employ a different stopping arrangement which not only provides for advance of the units wheel to zero, but also provides for a complete rotation of that wheel if it chances to be already at zero.

Referring to the utilization of the trip members 70 for the above purpose they are formed with latching shoulders 70$^c$ at the rear, (Figs. 11 and 12), and a comb-plate 100 (Fig. 6) is pivoted upon the accumulator pivot shaft 45$^b$. This comb-plate has a forwardly extending finger 100$^a$ for each higher order wheel and the end of each finger is adapted to engage behind the shoulder 70$^c$ of the corresponding trip member 70. The comb-plate is normally elevated in opposition to gravity being supported by the latch plate 34 heretofore mentioned, which has a shoulder 34$^a$ for engaging a stud 100$^b$ on the side arm of the comb-plate, as shown in Figs. 5, 6 and 11. It will be remembered that a clearing key 19 rocks the latch plate. This has the effect of disengaging its said shoulder from the stud of the comb-plate and permitting the latter to lower bringing its fingers 100$^a$ behind the shoulders 70$^c$ of the transfer trip members (Fig. 12). An ensuing operation of the machine with the key 18 down will then result in all higher order wheels being held at the "9" position pending the advance of the units wheel to the zero position.

The stopping of the units wheel (which appears at the upper right hand corner of Fig. 6) is effected by a special arm 105 pivoted concentrically with the comb-plate 100 and overlying the lateral branch 100$^e$ of a side arm 100$^c$ of said comb-plate, as shown in said figure of the drawings. Thus this special stop arm lowers along with the comb-plate. For stopping the units wheel at zero when it is registering other than zero it would suffice to simply put this arm in the path of the stud 71$^c$, as in Fig. 13, but of course the units wheel may be registering zero, and, as it is essential that the other wheels shall receive carrying impulses to take them from "9" to "0," the units wheel must always pass from "9" to "0" in order to start the series of transfer operations, and so in case of its already standing at zero it must make a complete rotation or pass from 0 to 0. Hence the separate mounting of this zero stop arm which provides for its dropping upon the stud 71ᶜ if the units wheel is at zero as shown in Fig. 15, the comb-plate moving on down after the special arm has come to rest on the stud as shown in Fig. 16. As the units wheel starts to rotate this special stop arm will drop until it rests again on the comb-plate branch 100ᵉ and will then take up a position wherein it stops the rotation of the wheel at zero as illustrated in Fig. 17. Inasmuch as the arm must be capable of rising above the stop-stud when the operation proceeds and the higher order wheels are released to partake of transfer movement, the stop arm is not made in one piece but has at its extremity a separate pivotally mounted member in the form of a blade 106 normally held up against the under side of the stop arm by a spring 107 coiled around its pivot, as most clearly shown in Fig. 6ª. Obviously this spring will yield and permit the plate to wipe past the stud when the comb-plate is lifted and elevates the arm 105, as shown by dotted lines in Fig. 17.

*Interrelation of Accumulators.*

The above described particular construction of accumulating mechanism, as well as the above-described coöperating means for clearing or zeroizing the accumulator, possess considerable novelty, but it is to be clearly understood that my invention in its chief essentials is by no means restricted to the employment of these particular forms of means. Though I believe them to be especially well-conceived for the purposes of my invention, and they may be taken as constituting the best form of means now known to me for accomplishing my result, it will be apparent to those skilled in the art that the carrying out of the main purpose of my invention is not dependent upon any one particular form of accumulating mechanism. I may say, however, that it is practically essential to employ a form of carrying mechanism somewhat radically different from that commonly used in machines of the type to which I have chosen to apply my invention for the purposes of the present disclosure, the reason being that the common form of carrying mechanism employed in this type of machines involves movement of the actuators or racks for carrying purposes which, with two or more sets of accumulating wheels arranged to coöperate with the same set of racks, would mean that the carrying mechanism would to some extent be common to the several accumulators, and this might defeat the main objects of the present invention. It will be observed that the carrying mechanisms of my two accumulators are quite independent of each other. The importance of this will be readily recognized when it is considered that differing registrations are to be carried by the two sets of accumulators and consequently carries are bound to occur at different times in the two accumulators.

I shall now proceed to point out how the main purposes of my invention are effectively accomplished through employment of the accumulating mechanisms already described, together with controlling means especially provided for the ready accomplishment of the desired results, prefacing this description with a repetition of the general statement made at the outset that the pith of the invention resides in the automatic registration upon one set of wheels of the registration, or the complement of the registration, standing upon another set of wheels, through measurement of movements of actuators by the latter set of wheels without reverse turning thereof.

The next following description has to do with the passing of complemental quantities between accumulators for both subtracting operations and recapitulating operations, the latter being in fact repetitions of subtracting operations though the ultimate result is not subtraction but grand totalization of sub-totals brought about through the adding together of complements of successive sub-totals.

*Passing complements between accumulators.*

I have already pointed out how the clearing or zeroizing of a set of wheels is accomplished by forward rotation thereof, which process involves transfers from wheel to wheel so that it amounts in effect to an addition of the right amount to make the total registration exceed by one unit the capacity of the wheels. Necessarily this means that the exact complement of the registration is added. It follows that if another set of wheels is engaged with the racks throughout the movement of the latter as governed by the forward turning of the first set of wheels, this complemental quantity will be passed to the second set of wheels and registered thereon, or correctly added to a registration already standing upon those wheels, provided the latter are equipped with carrying means.

It has already been explained that both sets of wheels shown have the same sort of carrying mechanisms. Furthermore, each is equipped with the same construction of clearing mechanism, from which it will be obvious that the passing of a complemental quantity can be caused to take place from either accumulator to the other.

It will now be clear that in order to effect this passing of the complemental amount from one set of wheels to the other, the clearing devices heretofore described should be made to take effect upon the set of wheels from which the complement is to be passed, but that in addition to this the other set of wheels should be brought into mesh with the racks. This I accomplish through operation of a single key, to wit, one or the other of the keys heretofore referred to as designated by the numeral 17. It has already been pointed out how these keys are in the form of levers and their lower arms 17ª arranged to act upon the lower arms 33 of the cam-plates 34, the latter being thus rocked by the keys 17 the same as by the keys 19. It will be recalled that for a simple clearing operation the key 18 and the key 19 associated with the accumulator to be cleared, are depressed. In such operations as are now being considered the keys 18 and 19 do not participate, but the key 17 which is brought into action performs the function of both keys 18 and one of the keys 19, that is to say it couples both of the shifter links 21 and 22 with their cam-plates 20, so that in the initial movement of the operating handle both sets of accumulator pinions will be brought into mesh with the racks, and said key shifts the associated latch 34 so that the stops are set for the clearing of one set of wheels. To this end of functioning as do keys 18, the lower arms 17ª of said key-levers 17 are formed with fingers 17ᶜ which extend in rear of studs 110 projecting laterally from different portions of a somewhat irregularly-shaped link 111 (Figs. 25 and 26) operatively connected with the bell-crank levers 45 which it will be remembered serve to normally uphold the links 21 and 22. Thus, this long link 111 is slotted at its forward end as shown at 111ª to embrace a stud 45ª in the depending arm of the forward bell-crank 45, and the said long link is similarly slotted at a middle point, as shown at 111ᵇ, to embrace a similar stud 45ª on the depending arm of the other bell-crank. Obviously, these slots provide for the rocking of the bell-cranks by the keys 18 without affecting the long link. In order to properly sustain the latter and make its movements regular it is supported at its rear end by a radius link 111ᶜ (Fig. 5) corresponding in length with the depending arms of the bell-cranks.

It will now be clear that movement rearward of the upper arm of either one of the key-levers 17, e. g., the forward one, (Fig. 26) will throw forward the long link 111 as illustrated in that figure, and thereby lower the horizontal arms of both of the bell-cranks 45, thus hooking the links 21 and 22 over the cam-plate studs 20ᵇ. This shifting of said key-lever also has the same effect as depression of the clearing key 19 in that it rocks rearward the latch-plate 34 with the result that the comb-plate 100 drops and the fingers thereof and the special arm 105—106 are set to stop the higher order wheels at 9 and the units wheel at zero. When the handle of the machine is then operated there is identically the same effect as to the forward set of wheels that has heretofore been described as the result of depression of the key 19, but as the rear wheels have also been brought into mesh with the racks, there is the additional effect of turning forward these rear wheels to extents corresponding with the extents of forward turning of the front set of wheels,—the units wheel to zero and the higher wheels to 9. In case the units wheel of the forward set already stands at zero and is given a complete rotation as before described, the units wheel of the rear set will likewise be given a complete rotation. It follows, therefore, that not only is the necessary carrying for zeroizing of the front set insured, but also carrying from the units wheel of the rear set to the tens wheel thereof, which is essential to the complemental registration in any case where there is a cipher in the units place in the amount whose complement is to be transferred. In such instances the advance or registering movement of racks which takes place under control of the wheels which are being turned to or toward zero does not itself correspond with the complemental quantity. However, the full complemental quantity will be passed to the rear wheels for the reason that the rotation of the units wheel causes the carry to the tens wheel.

*Subtraction.*

It will be understood from the above that with an amount registered upon the rear wheels which is in excess of that registered upon the front wheels, the latter amount as a subtrahend may have its complement added to the amount upon the rear wheels as a minuend, and these rear wheels will thereby be caused to register an amount correctly representing the remainder. Or if the situation is the reverse, then the complement of the registration on the rear wheels may be passed to the front wheels and added to the registration upon the latter. As a concrete example of commercial usage I may mention the employment of the two sets of wheels, the one for collecting totals of debits and the other totals of credits, and then the ascertainment of the balance.

*Recapitulation.*

It will be equally obvious that with the same relationship established between the set of wheels as for subtracting purposes, work of recapitulation can be practised such as the successive accumulation of different series of items and the accumulation of a grand total thereof. Thus, a set of amounts having been accumulated upon the front set of wheels, for example, and the rear set standing clear, the complement of the total upon the front set will be passed to the rear through the use of the front lever 17 as before. A second set of amounts will be collected upon the front set and the complement of their total passed to the rear set of wheels and added to the previous complemental registration thereof. At the end of a series of such operations the rear set of wheels will be registering the complement of the grand total and the front wheels will stand clear. By then using the rear lever 17 the grand total itself may be registered upon the front wheels as a complement of the registration upon the rear wheels.

*Release of higher order wheels for zeroizing carries.*

Referring next to the means here shown whereby the higher order wheels of a set being turned to zero are released so as to be able to partake of carries or transfer movements, each of the comb-plates 100 has a rearwardly-extending tail-piece 100$^d$ (Figs. 5, 6, 11–17, 25 and 26) with a slightly-raised portion just in rear of the body of the comb-plate and a downwardly-inclined rear portion with a slightly-upturned terminal. A bar 112 coöperates with these tail-pieces for the purpose of lifting the comb-plates and thereby freeing the transfer trip arms 70, so that they will no longer obstruct the wheel studs 71$^a$ but will be displaced thereby so that transfers will take place in the manner already described. (The units wheel stop arms 105 are lifted by the comb-plates in which connection the hinged blades 106 yield as beforementioned and as illustrated in Fig. 17.) The said bar 112 is supported by radius links 113 and carries studs 112$^b$ to act respectively upon the tail-pieces of the comb-plates. Normally the said bar is held by a spring 112$^c$ in a rearward position with its stud 112$^b$ spaced from the said tail-pieces as shown in Figs. 5, 24 and 25, and in an operation which is not preceded by the setting of either of the keys 17 or either of the keys 19, the comb-plates of course remain elevated and in the advance of the bar 112, presently explained, the studs 112$^b$ simply pass above the raised portions of the tail-pieces without effect. However, if there has been an operation of one of said keys and the corresponding comb-plate has dropped and its tail-piece has thus been elevated (Figs. 13 and 26), then the inclined portion of the latter will have been brought in front of one of the studs 112$^b$, in which case the forward movement of the bar 112 will cause that stud to act upon the tail-piece of the comb-plate, as illustrated in Fig. 14, first with a camming effect upon its inclined portion whereby the comb-plate is lifted, after which the stud rides upon the elevated portion of the tail piece to hold the comb-plate up long enough to insure the tripping of all transfers.

For the purpose of imparting the forward movement to the bar 112 at the proper time, it is coupled at its rear end to a link 114 (Fig. 5) which extends rearwardly for coöperation with a wiper pawl 115 carried by the before-mentioned vibrating arm 26 (Figs. 2–4). The said link 114 is coupled at its rear end to a radius link 116 and the coupling stud 117 is elongated for coöperation with said wiper pawl 115. The latter is pivoted upon the upper end of the arm 26 and held by a spring 118 against a stop stud 119. Normally the wiper pawl stands just forward of the stud 117 as shown in Fig. 2, and when the arm 26 swings rearward at the outset of the operation this pawl simply wipes under said roller and passes on, but when said arm 26 swings the other way, at the beginning of the last half cycle of the operation of the machine, the forward side of the wiper pawl acts on the stud 117 and forces the bar 114 forward with the result already described. This is timed to occur during the latter part of the movement of the said arm 26 when transfer segments 60 have been engaged with the pinions and the latter have been disengaged from the racks. Obviously the result is that the necessary carrying impulses are given the wheels to advance them successively from 9 to 0.

*Printing.*

Referring next to the matter of printing, it will be understood that the mere listing of items will occur as in many familiar types of adding and listing machines, in which connection I have already stated that the printing mechanism itself need not vary from other types and I have here illustrated the regular printing mechanism of the "Burroughs Visible". This machine is commonly equipped with a so-called "non-print" key and this will preferably be availed of in operations which involve the movement of racks for complemental registering, for there would be no particular object in printing complemental amounts, and besides there are instances such as before-mentioned where the movement of the racks does not correspond exactly with the complemental quantity and therefore would not result in setting up type representing such quantity.

As before mentioned the basic principle of my invention is such as to preclude the striking of totals by the most familiar method, to wit, that of backward rotation of wheels for the setting up of type through advance of racks. I resort to another method of striking totals which in itself is also well-known, though I may mention here that I employ it in a novel manner whereby to accomplish work of recapitulation, besides which I employ the principle in modified arrangements for carrying out my invention both in the matter of recapitulation and subtraction.

Referring first to the printing of totals (which is the same with reference to both accumulators) I secure to each registering wheel a graduated cam 120, (Figs. 5, 6, 20–23, 27 and 28), the same being of the "snail" variety, though preferably divided into ten peripheral sections separated by substantially radial shoulders. These sections correspond with the numerical divisions of the wheel, the outermost section corresponding with the zero inscription on the wheel, the next outermost section corresponding with the "1" inscription on the wheel and so on to the lower or innermost section which represents "9". Feelers 130 are adapted to coöperate with these cams for setting the type-carriers, said feelers being in the form of hook-shaped fingers loosely mounted upon a rock-shaft $16^b$ to which the total key-lever 16 is secured. The feelers have depending elongated arms $130^a$ with studs $130^b$ occupying slots of elongated bars 131. The slots $131^a$ at the forward ends of these bars receive the studs of the forward set of feelers which coöperate with the forward set of accumulator wheels, and the rear set slots $131^b$ receive the studs of the rear set of feelers which coöperate with the rear accumulator wheels. The bars 131 are connected respectively with links 132 which are in turn coupled respectively to downwardly-extending arms 133 of bell-cranks, one for each rack-bar, whose rearwardly-extending arms $133^a$ carrying studs 134 to coöperate with stepped or shouldered frames or plates 135 mounted upon the rack bars 3 respectively. Normally the studs 134 stand above the stepped portions of these frames or bars, the latter being offset at $135^a$ (See Fig. 6) so that they may pass forward without being obstructed by the studs 134.

Springs 136 applied to the feeler-levers below their pivots tend to throw their upper ends or fingers into engagement with the cams 120, but they are normally restrained by bails, of which the before-mentioned depending arms $16^a$ of the total key-levers constitute side arms. In each case there is a duplicate of such side arm to constitute the other side member of the bail and there is a connecting cross-rod $16^c$ which engages the front sides of the depending arms of the feelers. A spring 137, powerful enough to overcome the spring 136, holds the bail rearward. When the handle of the total key-lever is forced back of course the bail is swung forward and the feelers thereby released so that their springs 136 may throw them into contact with the respective cams 120. The motion is transmitted to the bell-cranks 133 so that the studs 134 will be set in various positions confronting vertical shoulders $135^b$ of the rack-frames or plates 135. When the machine is then operated (the racks having all been released through the medium of the slotted links 30 and wires 31 as before explained) they will advance and the contact of the shoulders $135^b$ with the studs 134 will measure their movements so that types will be presented to the printing line corresponding with the registration.

While the slot-and-pin connection between racks and type-carriers is not required in the present construction in connection with carrying operations, whereas in machines of the "Burroughs Visible" type such slot-and-pin connection does serve for carrying purposes, yet this sort of connection comes into play in the setting up of zero types in machines of this character, and since I have chosen in the present instance to adapt my invention to this type of machine in which ciphers are not normally at the printing line, I provide for relative movement between the type-carriers and the racks after the manner of such movement in such prior machines. Thus the aforesaid frames or plates 135 which are rigidly attached to the type-carrier bars 404, are slotted as at $135^c$ to receive studs $3^d$ on the racks and are also slotted at $135^d$ to accommodate studs $3^e$ on the rack bars to which are attached springs 138 which are connected at their opposite ends to studs on the plates 135. It will be understood that normally the plates 135 are held back by the restoring bail of the machine as in the case of the bars 404 of the aforesaid Pike patent 763,692, and consequently the springs 138 are tensioned. Upon movement of the said restoring bail the plates 135 move forward one step so that the rear ends of their slots $135^c$ come in contact with the studs $3^d$ as shown in Fig. 28. The latter illustrates an operation of the machine for totaling purposes wherein the highest order wheel stands at 9 and the associated feeler 130 therefore moves the greatest distance and sets the connected stud 134 in front of the rearmost shoulder $135^b$ of the plate 135, which shoulder as here shown is coincident with the front end of the bar 404. The latter together with the plate 135 having advanced a step so as to bring the cipher to the printing line and then being permitted to advance nine steps more, obviously presents the 9-type at the printing line.

Modified recapitulation.

The above described totaling arrangement may be availed of for recapitulation purposes or the so-called "duplex" work of a machine of this general type. Thus if it should be desired, for example, to register upon the rear wheels the grand total of successive sub-totals collected upon the front wheels, the rear key 18 would be depressed in addition to the setting of the front total key 16. Obviously the racks 3 moving forward distances determined by the setting of the various studs 134, will register upon the rear wheels the amount standing upon the front wheels. This having been done the front clearing key 19 may be employed to turn the front wheels to zero and these wheels may then be employed to accumulate a second series of items. With the printing of the total of the latter this total may be added to the registration on the rear wheels and eventually the grand total collected upon the rear wheels may be printed by using the rear total key 16.

Modified subtraction.

The principle last above described whereby work of recapitulation can be carried on, may be further developed so as to provide for work of subtraction by way of such complemental process hereinbefore treated, to wit, the process of adding to the minuend registration on one set of wheels the complement of the subtrahend registration on the other set of wheels.

Figs. 29 to 32 illustrate this modification which embraces both the before described total-printing arrangement with its recapitulation function, and the modified subtraction arrangement. This latter involves the equipping of the wheels with additional snail cams set reversely to the cams 120. Such additional cams are here shown secured to the wheels between the cams 120 and the sides of the wheels, and, with the exception of the units cam, are designated by the numeral 140. It will be observed that through the reverse setting of these additional cams a complemental relation is established as between them and the cams 120 and consequently as between them and the wheels or the inscriptions carried by the wheels. Thus the zero section of a cam 140 corresponds in location circumferentially with the 9 section of the neighboring cam 120, as clearly illustrated in Fig. 29, and so on throughout the series of cam sections. Obviously, therefore, if a feeler 130 strikes the cam 140 instead of the cam 120 the setting of the stop stud 134 will be a complemental one and the movement of the associated rack bar 3 will likewise bear a complemental relation to the registration upon the wheel.

It follows that by having the cams 140 aline with the feelers 130 associated with one set of wheels, the racks may be caused to advance a distance which is calculated to register upon the other set of wheels the complement of the amount registered upon the first set,—it being understood of course that the latter remain stationary and out of engagement with the racks and that the second set of wheels is put into engagement with the racks through depression of the appropriate key and subsequent action of the controlling connections in a manner hereinbefore fully set forth.

In order to take care of the so-called "fugitive one," the cam 140$^a$ of the units wheel is specially formed to provide for advance of the units wheel of the receiving set of wheels a step farther than any higher order wheel corresponding with a wheel of the other set which is registering the same as the units wheel of that set. Thus said cam 140$^a$ has all of its sections a step nearer the center than sections of the cams 140 associated with the higher order wheels, so that the feeler 130 which engages this units cam will carry the stud 134 a step farther and so permit the units rack bar 3 to advance a step farther than it otherwise would.

In order that this modified subtracting arrangement may be brought into commission at will and the totaling arrangement put out of commission temporarily, the shaft 16$^b$ is slidably mounted in the side pieces of the main frame. A coiled spring 142, Fig. 30, normally holds this shaft to the left so that the feelers are in line with the totaling cams 120. A finger lever 143 is mounted upon the left-hand side piece of the main frame and bears against the protruding end of the shaft 16$^b$ and a latch 144 is mounted upon this frame piece for the purpose of engaging and holding the finger lever when it is operated in opposition to the spring 142 for the purpose of shifting the shaft 16$^b$ to the right and bringing the feelers 130 in line with the subtraction cams 140. A collar 145 on the shaft 16$^b$ acts against one side arm 16$^a$ of the before-described bail to carry the same and the feelers over to right with the shaft 16$^b$. The feelers are of yoke formation where they embrace the shaft and one yoke bears against another so that with a sleeve 146 interposed between the left-hand bail side pieces 16$^a$ and the highest order feeler as shown in Fig. 30, it will be obvious that the shaft, the yoke and the feelers can have no relative lateral motion, but must all move together. The slot of the casing through which the total key 16 protrudes will be widened sufficiently to provide for this shift and the casing may be appropriately marked to distinguish between subtraction and totaling positions of the key.

Since the rules of the Patent Office do not permit the inclusion in a single application, of claims limited to more than one specific embodiment of an invention, I do not make claims herein directed particularly to the mechanism described under the heading of "Modified subtraction" *supra*, such claims being made in my copending application, Serial No. 31,825, filed June 3, 1915, wherein a somewhat similar mechanism is disclosed.

It is obvious that my invention is of such scope as to be capable of embodiment in a great variety of ways, and it is therefore to be understood that I do not purpose limiting my claims to any one form of embodiment but intend them to be sufficiently comprehensive to embrace the many differing mechanical expedients which will suggest themselves to those skilled in this art for arriving at the results accomplished by the means here detailed as examples of mechanical expressions of my invention.

I claim:

1. In a machine of the class described, the combination of a set of actuators; two sets of accumulating wheels rotatable in one direction only by said actuators; transfer mechanism for each set of wheels; and means for measuring the movements of the actuators by the wheels of one set while said actuators are at the same time effecting additive registration upon the wheels of the other set to perform subtraction by complemental addition from one set to the other.

2. In a machine of the class described, the combination of a set of actuators; two sets of accumulating wheels rotatable in one direction only by said actuators; transfer mechanism for each set of wheels; and means for measuring the movements of the actuators by the wheels of either set while said actuators are effecting additive registration upon the wheels of the other set to perform subtraction by complemental addition from one set to the other.

3. In a machine of the class described, the combination with two sets of registering wheels and their transfer or carrying mechanisms; of means for passing to either such set of wheels the true complement of a registration standing upon the other set under control of the latter.

4. In a machine of the class described, the combination of a set of actuators, two sets of accumulating wheels and means for measuring the movements of the actuators by the wheels of one set while said actuators are effecting registration upon the wheels of the other set, such movements of the actuators bearing a true complementary relation to any registration standing upon the first set of wheels.

5. In a machine of the class described, the combination of a set of actuators; two sets of accumulating wheels rotatable in one direction only by said actuators; transfer mechanism for each set of wheels; and means for measuring the movements of the actuators by the wheels of one set while said actuators are effecting registration upon the wheels of the other set, such movements of the actuators bearing a true complemental relation to any registration standing upon the first set of wheels.

6. In a machine of the class described, the combination of a set of actuators; two sets of accumulating wheels rotatable in one direction only by said actuators; transfer mechanism for each set of wheels; and means for measuring the movements of the actuators by true complemental rotation of the wheels of one set while said actuators are effecting registration upon the wheels of the other set.

7. In a machine of the class described, the combination of a set of actuators; two sets of accumulating wheels rotatable in one direction only by said actuators; transfer mechanism for each set of wheels; and means for measuring the movements of the actuators by causing the units wheel of one set to rotate to zero and higher order wheels thereof to positions one step short of zero while engaged with the actuators and while the latter are engaged with the wheels of the other set.

8. In a machine of the class described, the combination of a set of actuators; a plurality of sets of adding wheels; carrying mechanism for each set; controlling means whereby either set may be caused to accumulate items through coöperation with said actuators; and controlling means whereby two sets of said wheels may be simultaneously engaged with the actuators and turned in the same direction thereby as when accumulating items, one set having its higher order wheels stopped short of zero and the wheel of lowest order at zero, and the actuators being thus caused to register upon the other set of wheels the true complement of a registration which stood upon the first set, the carrying mechanism of the latter set then advancing the higher order wheels thereof to zero.

9. In a machine of the class described, the combination of a set of actuators; a plurality of sets of adding wheels; carrying mechanism for each set; controlling means whereby either set may be caused to accumulate items through coöperation with said actuators; and controlling means whereby two sets of said wheels may be simultaneously engaged with the actuators and turned in the same direction thereby as when accumulating items, one set having its higher order wheels stopped short of zero and the wheel of lowest order at zero, with provisions for advancing the same from zero to zero,—the actuators being thus caused to register upon the other set of wheels the true complement of the registration which stood upon the first set.

10. In a machine of the class described, the combination of actuating racks; two sets of gear wheels; movable supports for the same; means for intermittently shifting said supports to engage and disengage the wheels and racks; setting devices whereby the shifting means for either or both of said sets of wheels may be rendered operative; carrying mechanism for each set of wheels; and manipulative means for causing engagement of both sets of wheels with the actuators and setting stops to limit forward rotation of one set of wheels so that all higher order wheels thereof will be held at positions one step short of zero and the wheel of lowest order of that set at zero position and the rack movements thereby measured and the other set of wheels thus caused to receive the true complement of any registration on the first set.

11. In a machine of the class described, the combination of actuating racks; two sets of gear wheels; movable supports for the same; means for intermittently shifting said supports to engage and disengage the wheels and racks; setting devices whereby the shifting means for either or both of said sets of wheels may be rendered operative; carrying mechanism for each set of wheels; and manipulative means for causing engagement of both sets of wheels with the actuators and setting stops to limit forward rotation of one set of wheels so that all higher order wheels thereof will be held at positions one step short of zero and the wheel of lowest order of that set at zero position, with provisions for advancing the same from zero to zero,—the rack movements being thereby measured whereby the other set of wheels is caused to receive the true complement of a registration upon the first set.

12. In a machine of the class described, the combination of actuating racks; two sets of gear wheels; movable supports for the same; means for intermittently shifting said supports to engage and disengage the wheels and racks; setting devices whereby the shifting means for either or both of said sets of wheels may be rendered operative; carrying mechanism for each set of wheels; and manipulative means for causing engagement of both sets of wheels with the actuators and for locking certain members of the carrying mechanism to stop higher order wheels of one set at positions one step short of zero with provisions for permitting the wheel of lowest order of that set to turn to zero,—the rack movements being thereby measured and the other set of wheels caused to receive the true complement of a registration on the first set.

13. In a machine of the class described, the combination of actuating racks; two sets of gear wheels; movable supports for the same; means for intermittently shifting said supports to engage and disengage the wheel and racks; setting devices whereby the shifting means for either or both of said sets of wheels may be rendered operative; carrying mechanism for each set of wheels; a key for operating the setting devices for both sets of wheels; and stops set by said key for limiting advance of higher order wheels of one set to positions one step short of zero with provisions for permitting the lowest order wheel of that set to advance to zero; whereby the true complement of the registration upon that set of wheels may be registered upon or added to a registration upon the other set of wheels.

14. In a machine of the class described, the combination of actuating racks; two sets of gear wheels; movable supports for the same; means for intermittently shifting said supports to engage and disengage the wheel and racks; setting devices whereby the shifting means for either or both of said sets of wheels may be rendered operative; carrying mechanism for each set of wheels; a key for operating the setting devices for both sets of wheels; locking devices rendered effective by said key to convert members of the carrying mechanism into stops for limiting forward rotation of higher order wheels to positions one step short of zero; and a stop set by said key to limit forward rotation of lowest order wheel to zero position, with provisions for permitting rotation of said wheel from zero to zero.

15. In a machine of the class described, the combination of actuating racks; two sets of gear wheels; movable supports for the same; means for intermittently shifting said supports to engage and disengage the wheels and racks; setting devices whereby the shifting means for either or both of said sets of wheels may be rendered operative; carrying mechanism for each set of wheels, said mechanism including members displaced by the wheels when stepping to zero; normally retracted latches to prevent displacement of said members; a key and connections for releasing said latches; and a stop for the wheel of lowest order also normally retracted and adapted to be released by said key and connections, together with provisions for permitting said lowest order wheel to rotate from zero to zero when said key is operated.

16. In a machine of the class described, the combination of a set of wheels; actuators therefore tending to advance; detents restraining them; driving elements including actuator-restoring means; means operated by the driving elements to engage and disengage the actuators and wheels; carrying devices; and means for causing engagement of the wheels and actuators and release of the latter from the detents and the setting of stops for limiting rotation of higher order wheels to positions one step short of zero; with provisions for permitting the wheel of lowest order to turn to zero, whereby clearing or zeroizing of all the wheels results through operation of the carrying mechanism.

17. In a machine of the class described, the combination of a set of wheels; actuators therefor tending to advance detents restraining them; driving elements including actuator-restoring means; means operated by the driving elements to engage and disengage the actuators and wheels; carrying devices; and means for causing engagement of the wheels and actuators and release of the latter from the detents and the setting of stops for limiting rotation of higher order wheels to positions one step short of zero; with provisions for permitting the wheel of lowest order to turn to zero and from zero to zero, whereby clearing or zeroizing of all the wheels results through operation of the carrying mechanism.

18. In a machine of the class described, the combination of a set of wheels; actuators therefor tending to advance; detents restraining them; driving elements including actuator-restoring means; means operated by the driving elements to engage and disengage the actuators and wheels; carrying devices including members displaced by the wheels when stepping to zero; and means for causing engagement of the wheels and actuators and release of the latter from the detents and the blocking of aforesaid displaceable carrying members for limiting rotation of higher order wheels to positions one step short of zero; with provisions for permitting the wheel of lowest order to turn to zero, whereby clearing or zeroizing of all the wheels results through operation of the carrying mechanism.

19. In a machine of the class described, the combination of a set of wheels; actuators therefor tending to advance; detents restraining them; driving elements including actuator-restoring means; means operated by the driving elements to engage and disengage the actuators and wheels; carrying devices including members displaced by the wheels when stepping to zero; and means for causing engagement of the wheels and actuators and release of the latter from the detents and the blocking of aforesaid displaceable carrying members for limiting rotation of higher order wheels to positions one step short of zero;. with provisions for permitting the wheel of lowest order to turn to zero and from zero to zero, whereby clearing or zeroizing of all the wheels results through operation of the carrying mechanism.

20. In a machine of the class described, the combination of a set of wheels; actuators therefor tending to advance; detents restraining them; driving elements including actuator-restoring means; means operated by the driving elements to engage and disengage the actuators and wheels; carrying devices including members displaceable by the wheels when stepping to zero; normally-retracted latches for said members; a key and connections for causing engagement of said wheels and actuators and releasing said latches to block said members which then constitute stops for limiting advance of higher order wheels to positions one step short of zero; and a normally-retracted stop for the lowest order wheel also released by said key; together with provisions for permitting said wheel to rotate from zero to zero.

21. In a machine of the class described, the combination of a set of wheels; actuators therefor tending to advance; detents restraining them; driving elements including actuator-restoring means; means operated by the driving elements to engage and disengage the actuators and wheels; carrying devices including members displaceable by the wheels when stepping to zero; normally-retracted latches for said members; a key and connections for causing engagement of said wheels and actuators and releasing said latches to block said members which then constitute stops for limiting advance of higher order wheels to positions one step short of zero; a normally-retracted stop for the lowest order wheel also released by said key; together with provisions for permitting said wheel to rotate from zero to zero; and means operated by the driving elements for retracting said stop and said latches.

22. In a machine of the class described, the combination of a set of wheels; actuators therefor tending to advance; detents restraining them; driving elements including actuator-restoring means; means operated by the driving elements to engage and disengage the actuators and wheels; carrying devices including members displaceable by the wheels when stepping to zero, and normally-retracted wheel-turning members adapted to engage the wheel and be released by the said displaceable members and to turn the wheels when they are disengaged from the actuators; normally retracted latches for said displaceable members; a key and connections for causing engagement of said wheels and actuators and releasing said latches to block said members which then constitute stops for limiting advance of higher order wheels to positions one step short of zero; a normally-retracted stop for the lowest order wheel also released by said key; together with provisions for permitting said wheel to rotate from zero to zero; and means operated by the driving elements for retracting said stop and said latches when the wheels are disengaged from the actuators.

23. In a machine of the class described, the combination of a set of wheels; actuators therefor tending to advance; detents restraining them; driving elements including actuator-restoring means; means operated by the driving elements to engage and disengage the actuators and wheels; carrying devices; means for causing engagement of the wheels and actuators and release of the latter from the detents and the setting of stops for limiting rotation of higher order wheels to positions one step short of zero, with provisions for permitting the wheel of lowest order to turn to zero, whereby clearing or zeroizing of all the wheels results through operation of the carrying mechanism; a second set of wheels engageable with and disengageable from the actuators; and means for causing their engagement therewith simultaneously with the aforesaid engagement of the first set therewith whereby the complement of the latter's registration may be received by the second set of wheels.

24. In a machine of the class described, the combination of a set of wheels; actuators therefor tending to advance; detents restraining them; driving elements including actuator-restoring means; means operated by the driving elements to engage and disengage the actuators and wheels; carrying devices including members displaced by the wheels when stepping to zero; means for causing engagement of the wheels and actuators and release of the latter from the detents and the blocking of aforesaid displaceable carrying members for limiting rotation of higher order wheels to positions one step short of zero; with provisions for permitting the wheel of lowest order to turn to zero, whereby clearing or zeroizing of all the wheels results through operation of the carrying mechanism; a second set of wheels engageable with and disengageable from the actuators; and means for causing their engagement therewith simultaneously with the aforesaid engagement of the first set therewith whereby the complement of the latter's registration may be received by the second set of wheels.

25. In a machine of the class described, the combination of a set of wheels; actuators therefor tending to advance; detents restraining them; driving elements including actuator-restoring means; means operated by the driving elements to engage and disengage the actuators and wheels; carrying devices including members displaceable by the wheels when stepping to zero; normally-retracted latches for said members; a key and connections for causing engagement of said wheels and actuators and releasing said latches to block said members which then constitute stops for limiting advance of higher order wheels to positions one step short of zero; a normally-retracted stop for the lowest order wheel also released by said key; together with provisions for permitting said wheel to rotate from zero to zero; a second set of wheels engageable with and disengageable from the actuators; and means for causing their engagement therewith simultaneously with the aforesaid engagement of the first set therewith whereby the complement of the latter's registration may be received by the second set of wheels.

26. In a machine of the class described, the combination of a set of wheels; actuators therefor tending to advance; detents restraining them; driving elements including actuator-restoring means; means operated by the driving elements to engage and disengage the actuators and wheels; carrying devices; means for causing engagement of the wheels and actuators and release of the latter from the detents and the setting of stops for limiting rotation of higher order wheels to positions one step short of zero, with provisions for permitting the wheel of lowest order to turn to zero, whereby clearing or zeroizing of all the wheels results through operation of the carrying mechanism; a second set of wheels engageable with and disengageable from the actuators; means for causing their engagement therewith simultaneously with the aforesaid engagement of the first set therewith whereby the complement of the latter's registration may be received by the second set of wheels; and carrying devices for the second set of wheels.

27. In a machine of the class described, the combination of a set of wheels; actuators therefor tending to advance; detents restraining them; driving elements including actuator-restoring means; means operated by the driving elements to engage and disengage the actuators and wheels; carrying devices; means for causing engagement of the wheels and actuators and release of the latter from the detents and the setting of stops for limiting rotation of higher order wheels to positions one step short of zero, with provisions for permitting the wheels of lowest order to turn to zero; a second set of wheels engageable with and disengageable from the actuators; means for causing their engagement therewith simultaneously with the aforesaid engagement of the first set therewith whereby the complement of the latter's registration may be received by the second set of wheels; carrying devices for the second set of wheels operative to effect carries upon their disengagement from the actuators; and means operated by the driving elements for releasing higher order wheels of the first set from their positions short of zero in connection with disengagement from the actuators of said wheels and those of the second set, whereby the wheels of said first set may all be brought to zero and the wheels of the second set caused to register the complement of the registration erased from the first set.

28. In a machine of the class described, the combination of a set of wheels; actuators therefor tending to advance; detents restraining them; driving elements including actuator-restoring means; means operated by the driving elements to engage and disengage the actuators and wheels; carrying devices including members displaceable by the wheels when stepping to zero; normally-retracted latches for said members; a key and connections for causing engagement of said wheels and actuators and releasing said latches to block said members which then constitute stops for limiting advance of higher order wheels to positions one step short of zero; a normally-retracted stop for the lowest order wheel also released by said key; together with provisions for permitting said wheel to rotate from zero to zero; a second set of wheels engageable with and disengageable from the actuators; means for causing their engagement therewith simultaneously with the aforesaid engagement of the first set therewith whereby the complement of the latter's registration may be received by the second set of wheels; carrying devices for the second set of wheels operative to effect carries upon their disengagement from the actuators; and means operated by the driving elements for retracting the aforesaid latches and said stop in connection with disengagement from the actuators of both sets of wheels, whereby the wheels of said first set may all be brought to zero and the wheels of the second set caused to register the complement of the registration erased from the first set.

29. In a machine of the class described, the combination of a set of wheels; actuators therefor tending to advance; detents restraining them; driving elements including actuator-restoring means; means operated by the driving elements to engage and disengage the actuators and wheels; carrying devices including members displaceable by the wheels when stepping to zero; normally-retracted latches for said members; a key and connections for causing engagement of said wheels and actuators and releasing said latches to block said members which then constitute stops for limiting advance of higher order wheels to positions one step short of zero; a normally-retracted stop for the lowest order wheel also released by said keys; together with provisions for permitting said wheel to rotate from zero to zero; a second set of wheels engageable with and disengageable from the actuators; a second key for effecting the same results as the first mentioned key and connections, with respect to the first set of wheels, and in addition thereto causing engagement of the second set of wheels with the actuators for receiving the complement of the registration erased from the first set.

30. In a machine of the class described, the combination of actuating racks; two sets of gear wheels; movable supports for the same; means for intermittently shifting said supports to engage and disengage the wheel and racks; setting devices whereby the shifting means for either or both of said sets of wheels may be rendered operative; carrying mechanism for each set of wheels; and manipulative means for causing engagement of both sets of wheels with the actuators, and setting stops to limit forward rotation of either set of wheels so that all higher order wheels thereon will be held at positions one step short of zero and the wheel of lowest order of that set at zero position and the rack movements thereby measured and the other set of wheels thus caused to receive the complement of any registration on the first set, whereby complements of successive accumulations on one set of wheels may be added together upon the other set of wheels and the grand total registered upon the first set by complemental control of racks by the second set.

31. In a machine of the class described, the combination of two sets of adding wheels; actuators therefor; means for measuring movements of the actuators by the registering condition of wheels of either set while disengaged from the actuators; and means for engaging the other set of wheels with the actuators to receive a registration corresponding with their thus measured movement.

32. In a machine of the class described, the combination of two sets of adding wheels; actuators therefor; means for setting stops for the actuators regulated by the registering condition of the wheels of one set which mechanically and differentially control the stops while disengaged from the actuators; and means for engaging the other set of wheels with the actuators to receive a registration governed by movement of the latter as limited by the stops so set.

33. In a machine of the class described, the combination of two sets of adding wheels; actuators therefor; means for setting stops for the actuators regulated by the registering condition of the wheels of either set which mechanically and differentially control the stops while disengaged from the actuators; and means for engaging the other set of wheels with the actuators to receive a registration governed by movement of the latter as limited by the stops so set.

34. In a machine of the class described, the combination of a set of adding wheels having graduated cams; racks for differentially actuating said wheels; stops for the racks; feelers connected to said stops and adapted to engage said cams; means for engaging and disengaging the racks and wheels; a second set of wheels engageable with and disengageable from the racks; and optionally operable means for setting the rack-stops by the feelers while the first set of wheels are disengaged from the racks, and engaging the second set of wheels with the latter to be turned thereby for registering the total standing on the first set.

35. In a machine of the class described the combination of two accumulators; number keys for registering amounts thereon; means for rendering the wheels of an accumulator rotatable; means independent of the number keys operating to register upon said accumulator wheels the amount appearing upon the other accumulator wheels and means for holding said other accumulator wheels non-rotatable during a complete cycle of operations of the machine for effecting said registration.

36. In a machine of the class described, in combination, two adding wheels, a graduated cam associated with each of said wheels, and means coöperable with the cam associated with one wheel operating to register on the other wheel the amount appearing on said first wheel.

37. In a machine of the class described, in combination, two sets of adding wheels, sets of graduated cams associated with said wheels, and means coöperable with the cams associated with one set of wheels operating to register on the other set of wheels the amount appearing on the said first set of wheels.

38. In a machine of the class described, in combination, two sets of adding wheels, sets of graduated cams rotatable with said wheels, and means coöperable with the cams associated with one set of wheels operating to register on the other set of wheels the amount appearing on the said first set of wheels.

39. In a machine of the class described, in combination, two sets of adding wheels, sets of graduated cams rotatable with said wheels and coaxial therewith, and means coöperable with the cams associated with one set of wheels operating to register on the other set of wheels the amount appearing on the said first set of wheels.

40. In a machine of the class described in combination, two sets of adding wheels; actuators common to both; number keys controlling the movements of the adding wheels; means for rendering one set of adding wheels rotatable; means operable independent of the number keys for registering upon said set of adding wheels the amount appearing upon the other set of adding wheels and means for rendering said other set of adding wheels non-rotatable during a complete cycle of operations of the machine for effecting said registration.

41. In a calculating machine, in combination, two accumulators, means for rendering either accumulator active or wholly inactive at will, and means coöperable with one accumulator while inactive to effect a registration on the other active accumulator.

42. In a calculating machine, in combination, two accumulators, means for communicating the true complements of amounts appearing on one accumulator to the other accumulator, said means also operating to communicate to the first accumulator the true complement of the sum of the true complements communicated to the second accumulator, whereby the recapitulation of the amounts appearing on the first accumulator is obtained.

43. In an adding machine two accumulators, means for rendering one accumulator operable and the other inoperable in combination with means for effecting registrations on the operable accumulator under continued control of the inoperable accumulator.

44. In an adding machine, two accumulators, means for rendering one accumulator rotatable and the other non-rotatable, in combination with means under control of the non-rotatable accumulator throughout the registrations of said accumulators for controlling registrations on the rotatable accumulator.

45. In an adding machine, a rack and two units wheels operating to engage said rack, in combination with means operating on occasion, during the addition of the complement in subtraction, to move the rack under control of either units wheel one point beyond its normal maximum movement and means to engage the other units wheel with the rack to receive a registration corresponding with this movement of the rack.

46. In an adding machine operating to handle the decimal system the combination of a rack, two units wheels, and means permitting a ten point travel of the rack during the addition of the complement in subtraction while controlled by either units wheel, said rack operating to register this travel on the other units wheel.

47. In an adding machine, a rack, two adding wheels of lowest order and means for bringing said rack and said adding wheels simultaneously into operative relation in combination with means operating during the addition of the complement in subtraction for moving said rack to rotate either of said adding wheels a complete revolution.

HEBER C. PETERS.

Witnesses:
F. C. RYMARCZICK,
J. B. RYMARCZICK.